United States Patent
Mahalingam et al.

(10) Patent No.: US 12,361,836 B2
(45) Date of Patent: Jul. 15, 2025

(54) DISTRIBUTED DETECT AND AVOID FOR UNMANNED VEHICLES

(71) Applicant: InterDigital Patent Holdings, Inc., Wilmington, DE (US)

(72) Inventors: Nagi Mahalingam, San Diego, CA (US); Ravikumar V. Pragada, Warrington, PA (US); Anantharaman Balasubramanian, San Diego, CA (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 1086 days.

(21) Appl. No.: 16/764,177

(22) PCT Filed: Nov. 13, 2018

(86) PCT No.: PCT/US2018/060603
§ 371 (c)(1),
(2) Date: May 14, 2020

(87) PCT Pub. No.: WO2019/099343
PCT Pub. Date: May 23, 2019

(65) Prior Publication Data
US 2020/0365042 A1  Nov. 19, 2020

Related U.S. Application Data

(60) Provisional application No. 62/585,828, filed on Nov. 14, 2017.

(51) Int. Cl.
*G08G 5/80* (2025.01)
*G08G 5/26* (2025.01)
(Continued)

(52) U.S. Cl.
CPC .......... *G08G 5/80* (2025.01); *G08G 5/26* (2025.01); *G08G 5/56* (2025.01); *H04W 4/40* (2018.02); *H04W 72/21* (2023.01)

(58) Field of Classification Search
None
See application file for complete search history.

(56) References Cited

U.S. PATENT DOCUMENTS

| 5,058,024 A | 10/1991 | Inselberg |
| 6,278,396 B1 | 8/2001 | Tran |

(Continued)

FOREIGN PATENT DOCUMENTS

| CN | 102184647 A | 9/2011 |
| CN | 102682626 A | 9/2012 |

(Continued)

OTHER PUBLICATIONS

English Language Translation, CN 102184647 A; PatDocs; 27 pages.

(Continued)

*Primary Examiner* — Aniss Chad
*Assistant Examiner* — Jennifer M Anda
(74) *Attorney, Agent, or Firm* — Mark D. Pratt

(57) ABSTRACT

Systems, methods and instrumentalities for a distributed detect and avoid (DM) framework for unmanned vehicles, such as unmanned aerial vehicles (UAVs). The systems, methods and instrumentalities may include a wireless transmit/receive unit (WTRU) associated with a vehicle. The WTRU may include a memory and a processor. The processor may be configured to store a trajectory of the vehicle and to send a message indicative of a conflict between the trajectory of the vehicle and a trajectory of another vehicle. The processor may be configured to receive a message from the other vehicle that is indicative of one or more conflicts and to determine a list that includes the vehicle(s) associated with the one or more conflicts. The processor may be configured to determine a resolution that addresses the conflict(s) associated with the list.

18 Claims, 19 Drawing Sheets

(51) Int. Cl.
*G08G 5/56* (2025.01)
*H04W 4/40* (2018.01)
*H04W 72/21* (2023.01)

(56) References Cited

U.S. PATENT DOCUMENTS

| | | | |
|---|---|---|---|
| 6,657,578 | B2 | 12/2003 | Stayton et al. |
| 9,053,634 | B2* | 6/2015 | Vilaplana ............... G08G 5/04 |
| 2002/0011950 | A1 | 1/2002 | Frazier et al. |
| 2002/0133294 | A1 | 9/2002 | Farmakis et al. |
| 2011/0118981 | A1* | 5/2011 | Chamlou ............... G08G 5/045 |
| | | | 701/301 |
| 2012/0215433 | A1 | 8/2012 | Subbu et al. |
| 2013/0332059 | A1 | 12/2013 | Del Pozo De Poza |
| 2014/0278029 | A1* | 9/2014 | Tonguz ............... G08G 1/161 |
| | | | 701/117 |
| 2015/0215903 | A1* | 7/2015 | Zhao ............... H04W 72/02 |
| | | | 370/329 |
| 2016/0155339 | A1 | 6/2016 | Saad et al. |
| 2016/0183219 | A1* | 6/2016 | Kim ............... H04W 52/38 |
| | | | 370/329 |
| 2017/0353819 | A1* | 12/2017 | Yin ............... H04W 72/21 |

FOREIGN PATENT DOCUMENTS

| | | |
|---|---|---|
| CN | 103873485 B | 3/2017 |
| EP | 2051151 A1 | 4/2009 |
| EP | 2667367 A1 | 11/2013 |

OTHER PUBLICATIONS

3rd Generation Partnership Project (3GPP), TS 36.321 V14.4.0, "Technical Specification Group Radio Access Network; Evolved Universal Terrestrial Radio Access (E-UTRA); Medium Access Control (MAC) protocol specification (Release 14)", Sep. 2017, 108 pages.
3rd Generation Partnership Project (3GPP), TS 36.331 V14.4.0, "Technical Specification Group Radio Access Network; Evolved Universal Terrestrial Radio Access (E-UTRA); Radio Resource Control (RRC); Protocol specification (Release 14)", Sep. 2017, 753 pages.
3rd Generation Partnership Project (3GPP), R1-1705026, "System Level Performance and Interference Mitigation Techniques for Aerial Vehicles", Qualcomm Incorporated, 3GPP TSG RAN WG1 Meeting #88bis, Spokane, USA, Apr. 3-7, 2017, 5 pages.
3rd Generation Partnership Project (3GPP), R1-1705823, "Field Measurement Results for Drone LTE Enhancement", KDDI Corporation, 3GPP TSG-RAN WG1 Meeting 88bis, Spokane, USA, Apr. 3-7, 2017, 6 pages.
3rd Generation Partnership Project (3GPP), 336.213 V14.14.0, "Technical Specification Group Radio Access Network, Evolved Universal Terrestrial Radio Access (E-UTRA), Physical Layer Procedures (Release 14)", Mar. 2020, 471 pages, 455 pages were received and considered JMA.
3rd Generation Partnership Project (3GPP), TS 36.300 V14.4.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 14)", Sep. 2017, pp. 1-329.
Denney et al., "Safety Considerations for UAS Ground-Based Detect and Avoid", 35th IEEE/AIAA Digital Avionics Systems Conference (DASC 2016), Sep. 25, 2016, 10 pages.
European Telecommunication Standards Institute (ETSI), ETSI GS MEC 003 V1.1.1, "Mobile Edge Computing (MEC), Framework and Reference Architecture", Mar. 2016, pp. 1-18.
Kopardekar, P, "Unmanned Aerial System (UAS) Traffic Management (UTM): Enabling Low-Altitude Airspace and UAS Operations", Ames Research Center, Apr. 2014, 20 pages https://ntrs.nasa.gov/api/citations/20140013436/downloads/20140013436.pdf.
Kopardekar, P, "Unmanned Aircraft System Traffic Management (UTM) Concept of Operations", AIAA Aviation, Jun. 13-17, 2016, 17 pages https://www.researchgate.net/publication/303902685_UAS_Traffic_Management_UTM_Concept_of_Operations_to_Safely_Enable_Low_Altitude_Flight_Operations.
Kuchar et al., "A Review of Conflict Detection and Resolution Modeling Methods", Available at <http://web.mit.edu/jkkuchar/www/ATC-102.pdf>, May 12, 2000, 33 pages.
Manathara, Joel George, "Collision Avoidance and Coalition Formation of Multiple Unmanned Aerial Vehicles in High Density Traffic Environments", Available at <https://jgmanathara.files.wordpress.com/2013/02/joelphdthesis.pdf>, May 2011, 227 pages.
3rd Generation Partnership Project (3GPP), TS 36.331 V14.0.0, "Technical Specification Group Radio Access Network, Evolved Universal Terrestrial Radio Access (E-UTRA), Radio Resource Control (RRC), Protocol Specification (Release 14)", Sep. 2016, pp. 1-644
3rd Generation Partnership Project (3GPP), TS 36.423 V14.0.0, "Technical Specification Group Radio Access Network, Evolved Universal Terrestrial Radio Access Network (E-Utran), X2 Application Protocol (X2AP) (Release 14)", Sep. 2016, pp. 1-239.
Kopardekar et al., "Unmanned Aircraft System Traffic Management (UTM) Concept of Operations", 16th AIAA Aviation Technology, Integration, and Operations Conference, Washington DC, USA, Jun. 13-17, 2016, pp. 1-16.
3rd Generation Partnership Project (3GPP), TS 36.304 V14.0.0, "Technical Specification Group Radio Access Network, Evolved Universal Terrestrial Radio Access (E-UTRA), User Equipment (UE) Procedures in Idle Mode (Release 14)", Sep. 2016, pp. 1-46.
Rios et al., "Enabling Exchange of Observation Data Between UAS Operations", National Aeronautics and Space Administration, Ames Research Center, Feb. 2017, 22 pages. https://aviationsystems.arc.nasa.gov/publications/2017/NASA-TM-2017-219462.pdf.
CN 103873485 B, Offce action issued in related European patent application number 18815847.1 on Dec. 6, 2023.

* cited by examiner

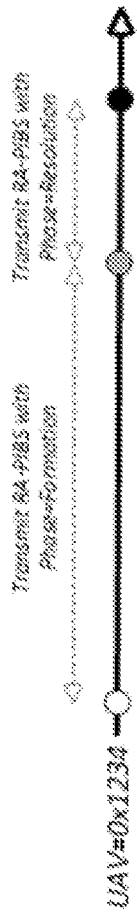
FIG. 11
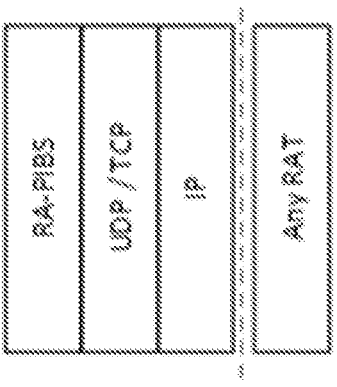
FIG. 12
FIG. 13

{ Source ID, Cluster ID, RA-list(), Priority, CHBidBit, Tiebreak, ... }

(1) RA-PIBS (0x1234, 0x1234401, [0x2345, 0x3456] (1), 1, 1...)
(2) RA-PIBS (0x2345, 0x2345511, [0x1234, 0x3456], 5, 1, 1...)
(3) RA-PIBS (0x3456, 0x3456601, [0x2345, 0x4567], 2, 1, 1...)
(4) RA-PIBS (0x4567, 0x4567781, [0x3456], 2, 1, 1...)

1st iteration

DISTRIBUTED DETECT AND AVOID FOR UNMANNED VEHICLES

CROSS-REFERENCE TO RELATED APPLICATIONS

This application is the National Stage Entry under 35 U.S.C. § 371 of Patent Cooperation Treaty Application No. PCT/US2018/060603, filed Nov. 13, 2018, which claims the benefit of U.S. Provisional Application No. 62/585,828, filed Nov. 14, 2017, and titled Distributed Detect and Avoid (DAA) Framework for Aerial Vehicles, the contents of which are hereby incorporated herein by reference in their entirety.

BACKGROUND

Unmanned vehicles have been developed to carry out tasks or missions without an onboard human operator or pilot. Unmanned aerial vehicles (UAVs) have frequently been employed to protect human pilots from the dangers associated with aerial military missions, although UAVs have increasingly been used for other non-military applications (e.g., commercial, scientific, recreational, agricultural, etc.). As the uses for UAVs continue to grow, the number of UAVs in operation at a given time and in a given airspace may also increase, thereby raising the risk of mid-air collisions between UAVs. To address such risks, UAVs may utilize technologies for collision detection and avoidance. For example, the UAVs may be part of a centralized system for sharing the UAVs' planned flight details. As such, UAVs in a given airspace may be able to determine if their respective flight paths potentially interfere with one another. However, the efficacy of such systems may at least partly depend on their ability to receive and disseminate up-to-date flight information in a timely manner.

For example, if a UAV's flight path is altered during a mission (e.g., due to adverse weather conditions), the updated flight path must be received by the central system and distributed to other UAVs that may be affected in sufficient time for the UAVs to consider whether changes to their flight plans may be warranted. The system may not be able to disseminate such information in time for the UAVs to make in-flight adjustments if they are in close proximity to one another. The issue may also arise, and/or be further exacerbated, if the UAVs are in area in which communications with the central system are limited or otherwise not available, such as in a rural area. Direct communications between UAVs may be leveraged to provide a distributed detect and avoid (DAA) framework.

SUMMARY

Systems, methods and instrumentalities for a distributed detect and avoid (DAA) framework for unmanned vehicles, such as unmanned aerial vehicles (UAVs), may be provided. The systems, methods and instrumentalities may include a wireless transmit/receive unit (WTRU), which may be associated with a vehicle. The WTRU may include a memory and a processor. The processor may be configured to store a trajectory of the vehicle and to send a message indicative of a conflict between the trajectory of the vehicle and a trajectory of another vehicle. The processor may be configured to receive a message from the other vehicle that is indicative of the conflict and to determine a list that includes the other vehicle. The processor may be configured to determine a resolution that addresses the conflict associated with the list. The message from the other vehicle may be indicative of conflicts with additional vehicles, which may be added to the list by the processor. The resolution determined by the processor may address the one or more conflicts associated with the one or more vehicles included on the list. The processor may send a message that includes the resolution addressing the one or more conflicts associated with the one or more vehicles included on the list.

BRIEF DESCRIPTION OF THE DRAWINGS

FIG. 11 illustrates example formation and resolution periods for conflict detection and avoidance.

FIG. 12 illustrates an example protocol stack for transmission of a resolution advisory PIBS (RA-PIBS) message.

FIG. 13 illustrates an example header and payload of a RA-PIBS message.

FIG. 15 illustrates example RA-PIBS messages from UAVs.

FIG. 17 illustrates example RA-PIBS messages from UAVs over multiple iterations.

DETAILED DESCRIPTION

Figure 1A:
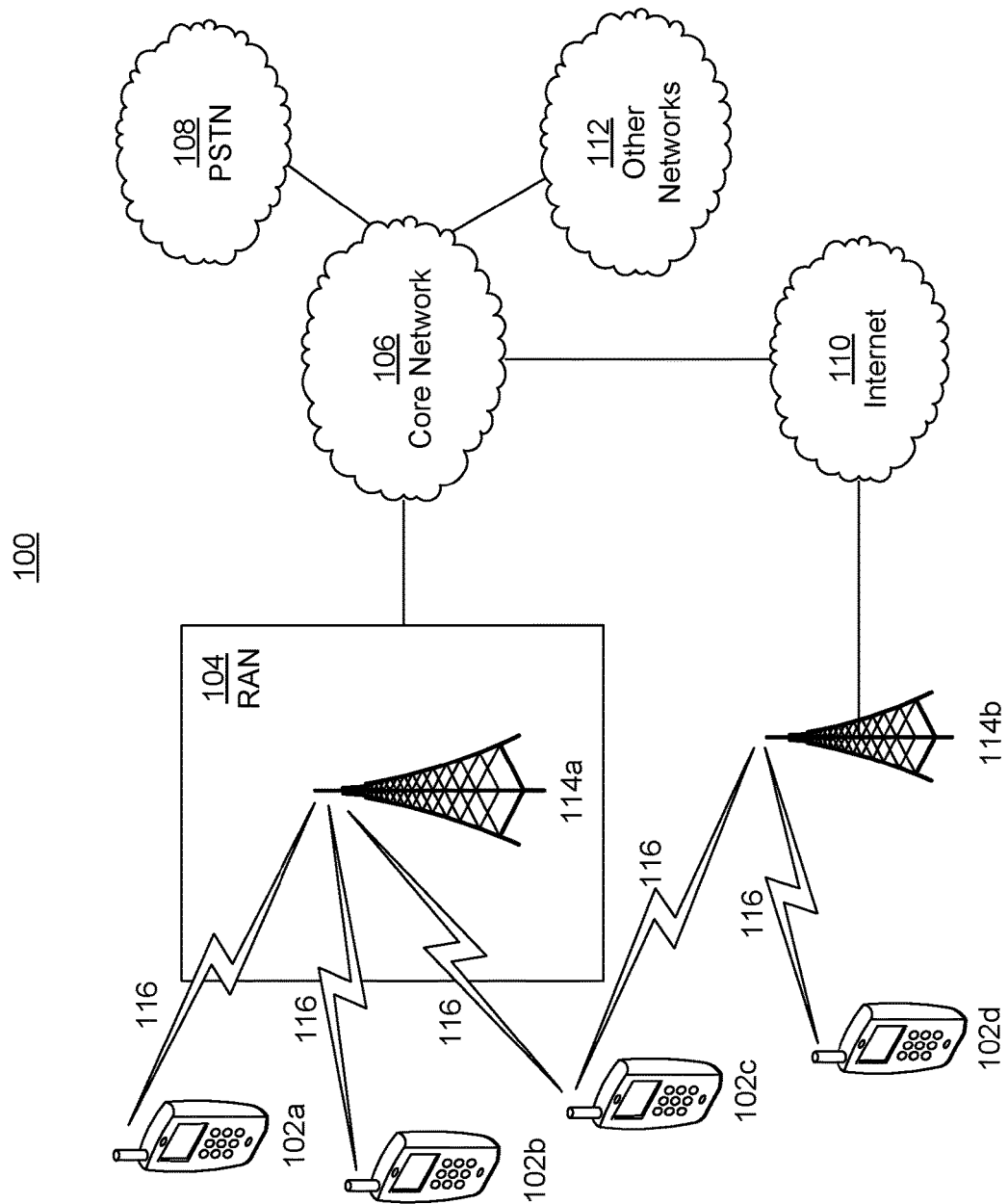
FIG. 1A is a system diagram illustrating an example communications system in which one or more disclosed embodiments may be implemented.

A detailed description of illustrative embodiments will now be described with reference to the various Figures. Although this description provides a detailed example of possible implementations, it should be noted that the details are intended to be exemplary and in no way limit the scope of the application.

A distributed detect and avoid (DAA) framework may be implemented for unmanned vehicles, such as unmanned aerial vehicles (UAVs). A UAV may detect collision risk by receiving a position intent broadcast service (PIBS) message from other UAV's and/or an unmanned aircraft system traffic management (UTM) system.

A UAV may form a cluster of UAV(s) for determining and avoiding collision risks. This may be performed using PIBS messages, PIBS-rebroadcast (PIBS-R) messages, and/or resolution advisory PIBS (RA-PIBS) messages. The cluster of UAVs may have a cluster head, which may be the UAV with the highest mission priority within the cluster. The cluster head and/or the UAV(s) within the cluster may maintain a (e.g., dynamic) list of the UAV(s) within the cluster that may be indicative of a conflict, e.g., a collision risk.

A UAV may detect collision risks. A UAV may receive configuration for side-link (SL) resources for the transmission of PIBS messages. A resource selection subset may be determined based on location and UAV strata. The UAV may transmit PIBS messages at periodicities that may be based on a configured PIBS transmit phase and/or a current UAV speed. The PIBS message may include at least heading information with one or more subsequent waypoints from the current location, which may be configured by the UTM system.

A UAV may form a cluster with other UAVs to facilitate the detection and avoidance of mid-air collisions. The UAV may receive PIBS and/or PIBS-R messages from other UAVs and/or the UTM system. The UAV may determine collision risks with the other UAVs by determining a closest time and point of approach (CPA). The UAV may transmit RA-PIBS based on configured RA-PIBS transmit phase and relative UAV speeds. The RA-PIBS message may include at least a field RA phase set to formation, a field cluster ID, and/or a field RA-list, which may identify UAVs with which the UAV is requesting conflict resolutions.

A UAV in a cluster may determine to be a cluster head. The UAV may receive a RA-PIBS message from one or more other UAVs that may include at least a field RA-list identifying the receiving UAV. The UAV may inherit a cluster ID of a high(er) priority UAV after determining relative priority among the cluster of UAVs. The UAV may acknowledge an interim cluster head by signaling an updated RA-list and chosen cluster head in the cluster ID field of the RA-PIBS message during a (e.g., every) configured RA-PIBS phase.

A UAV may determine one or more resolutions or resolution advisories. A cluster head may transmit an RA-PIBS message that may include at least a field RA phase set to resolution, a field cluster ID, and a field RA-list. The field RA-list may identify member UAVs for whom resolutions are pending and/or the UAVs for which the resolution provided by the cluster head is applicable. The cluster head may determine group-wise resolutions for a (e.g., each) UAV in the RA-list. The cluster head may transmit group-wise resolutions for a (e.g. each) UAV in the RA-list. The cluster head may dissolve the cluster by terminating the transmission of RA-PIBS messages and starting or resuming the transmission of PIBS messages. While the detailed description and accompanying figures may refer to UAVs, the disclosed subject matter is equally applicable to other types of unmanned vehicles, such as autonomous cars and trucks.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a UAV, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114 a and/or a base station 114 b. Each of the base stations 114 a, 114 b may be any type of device configured to wirelessly interface with at least one of the WTRUs 102 a, 102 b, 102 c, 102 d to facilitate access to one or more communication networks, such as the CN 106/115, the Internet 110, and/or the other networks 112. By way of example, the base stations 114 a, 114 b may be a base transceiver station (BTS), a Node-B, an eNode B, a Home Node B, a Home eNode B, a gNode B (gNB), a NR NodeB, a site controller, an access point (AP), a wireless router, and the like. While the base stations 114 a, 114 b are each depicted as a single element, it will be appreciated that the base stations 114 a, 114 b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
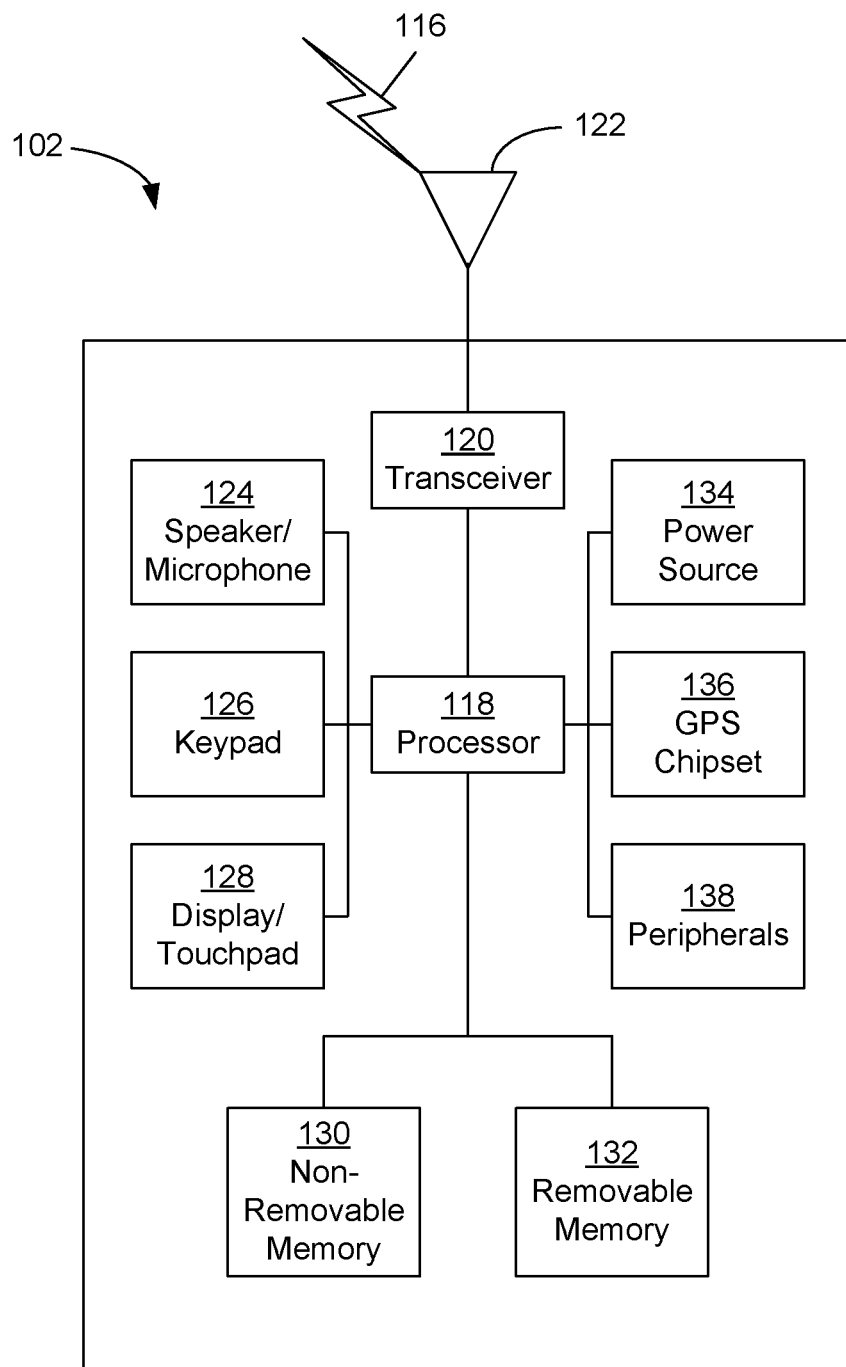
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IO), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
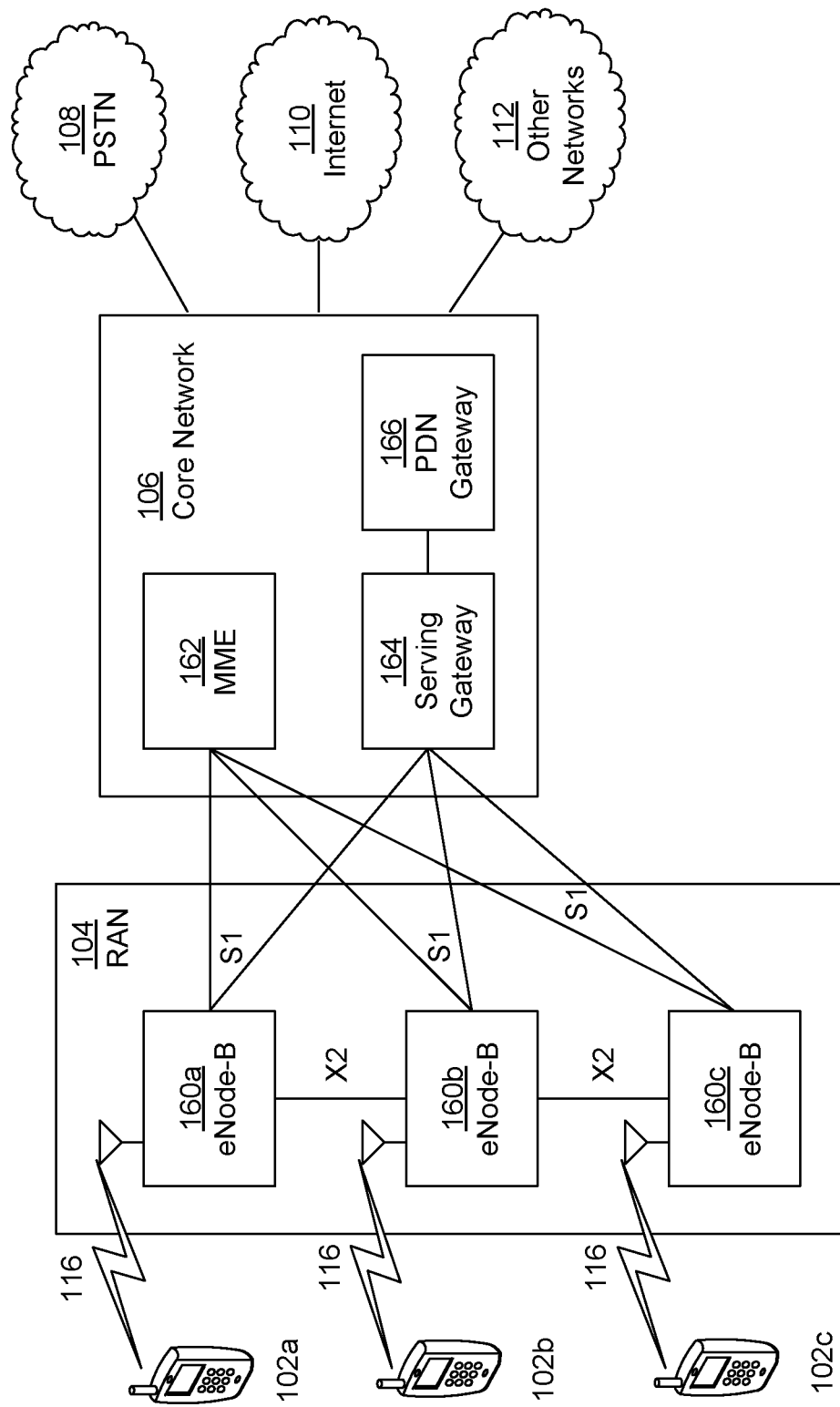
FIG. 1O is a system diagram illustrating an example radio access network (RAN) and an example core network (CN) that may be used within the communications system illustrated in FIG. 1A according to an embodiment.
FIG. 1D is a system diagram illustrating a further example RAN and a further example CN that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1O, the eNode-Bs 160a, 160b, 160c may communicate with one another over an X2 interface.

The CN 106 shown in FIG. 1O may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
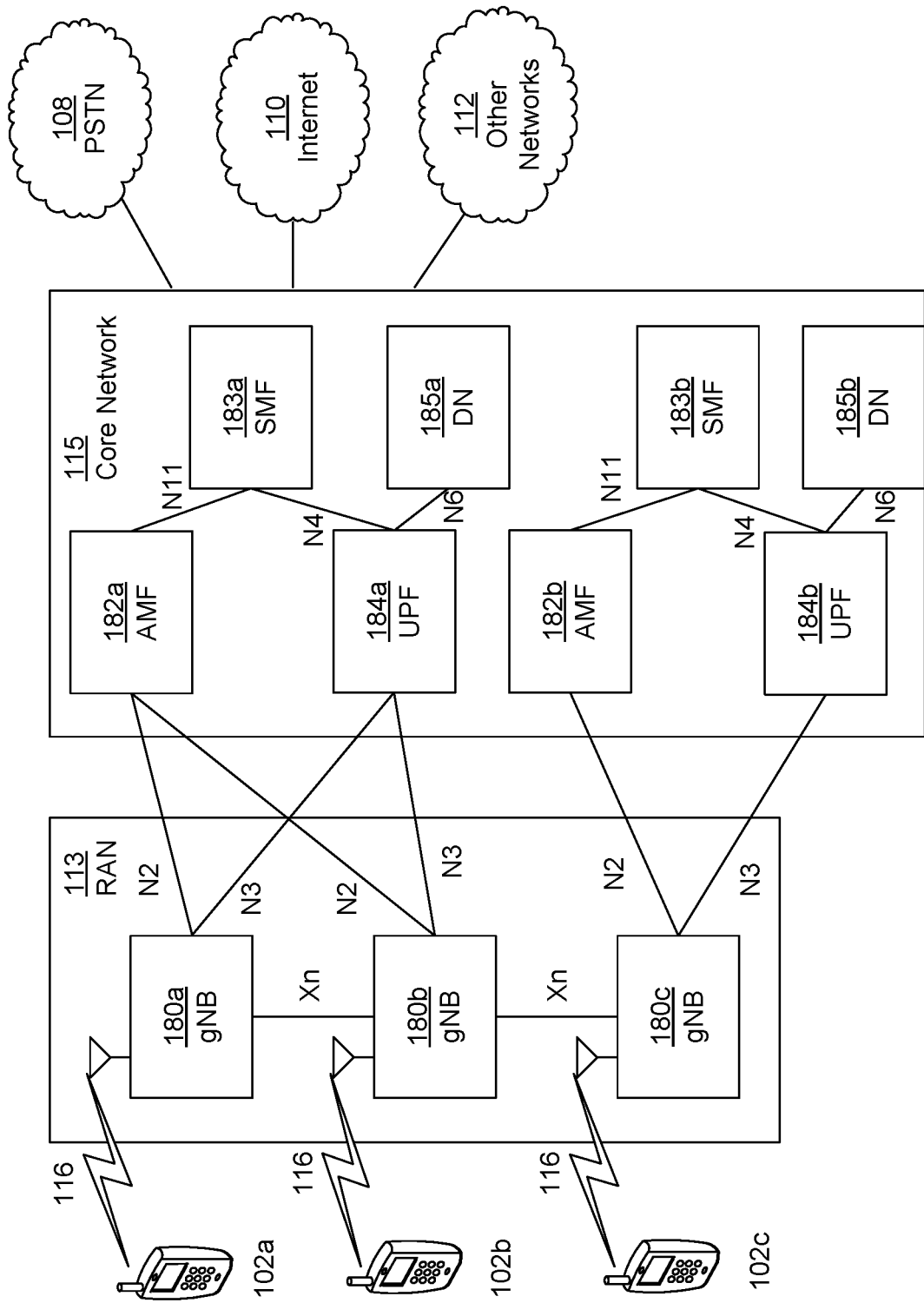

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Unmanned vehicles may impact a number of industries. Though early hints indicate several potential impact areas where unmanned vehicles may be employed, there may be several challenges to adoptability.

Unmanned vehicle (e.g., UAV) communications may be provided. UAV communications may include command and control (C2) infrastructure. C2 messages and/or signals may traverse between the UAVs and (e.g., regulatory) infrastructures, such as a UTM system. The C2 messages and/or signals may exchange, for example, measurements, configurations, commands, updates to commands and/or the like. The C2 messages and/or signals may be in a request-response form. C2 links between a UAV and the UTM system may be performed using high data-rate communication, which may provide information to the infrastructure. For example, a first person view may be provided by a UAV to a UTM system by delivering a high bit-rate video feed of its environment. A UAV may directly communicate with other UAVs in a vicinity, region or neighborhood, for example, to exchange position and/or intent information. This information may be used to avoid potential collisions and/or resolve potential path conflicts.

Collision detection and collision avoidance implementations may use a number of parameters from a UAV, such as a current position, an anticipated direction, a velocity, a momentum, and the like. The position information relating to a particular UAV may be known by a UAV management system and/or by (e.g., nearby) UAVs. Regulatory requirements may request a reliable communications fabric and accountability of the UAVs in flight. Redundancy in the measurement framework and/or an autonomous, distributed collision detection and avoidance scheme may be provided.

A DAA framework may be provided for UAVs. For example, a UAV may detect a collision risk by receiving a PIBS message from other UAVs and/or a UTM system.

A UAV may form a cluster of UAV(s) for determining collision risks. This may be performed using PIBS messages, PIBS-R messages, and/or RA-PIBS messages. The UAV cluster may have a cluster head, which may be the UAV with the highest mission priority within the cluster. The cluster head and/or the UAV(s) within the cluster may maintain a (e.g., dynamic) list of the UAV(s) within the cluster.

A UAV service supplier (USS) and UTM system may be provided. Within the UTM system, the USS may enable support for safe airspace operations. The USS may share information with other USSs. For example, the USS may share information regarding its supported operations and/or telemetry data from ongoing missions. This may promote safety and/or may allow a USS within the UTM system to have a view of UAV operations (e.g., all UAV operations). This may allow the USS to assist UAVs in remaining clear of each other. Mission related information may be shared between USSs. This may be implemented using an API, which may allow interoperability among USSs and/or may support data exchanges and exception handling. USSs may employ an authentication scheme which may provide improved consistency and/or security.

A UAV that commences a mission may be approved, tracked, and/or controlled by a USS. Tracking may be performed via position reporting of the UAV to the USS. For example, the position reporting may be performed periodically, and/or may be configured. The UAVs may communicate with the USS over an access network, such as an LTE network.

Figure 2:
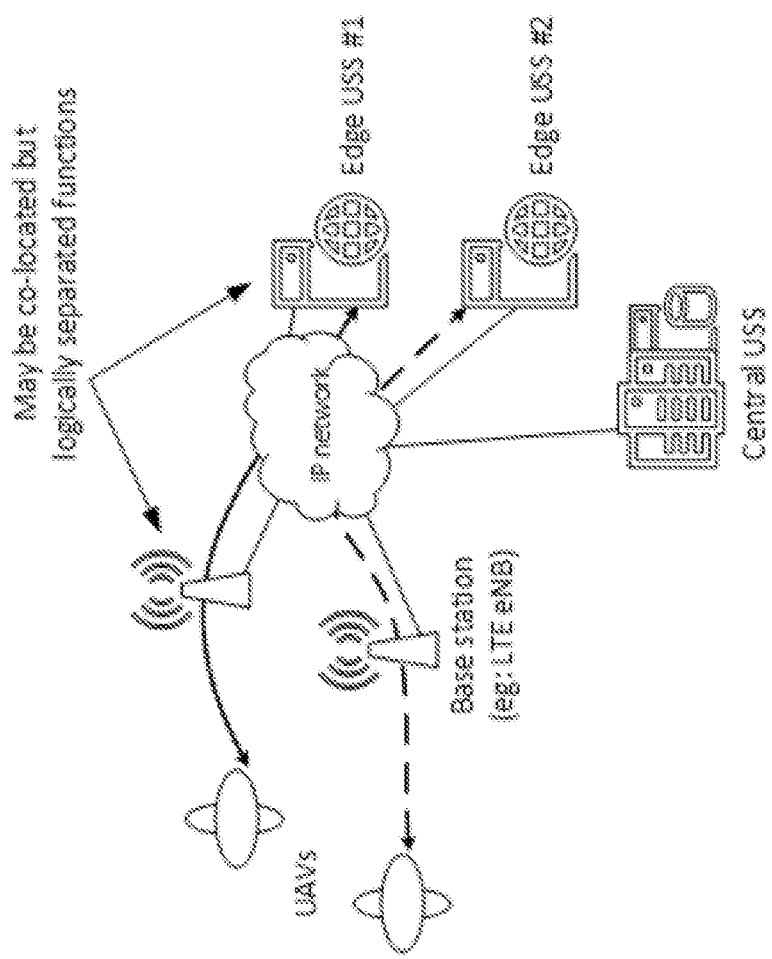
FIG. 2 illustrates an example communications architecture for servicing one or more unmanned aerial vehicles (UAVs) via one or more UAV service suppliers (USSs).

FIG. 2 illustrates an example communications architecture for servicing one or more UAVs via one or more USSs. As shown in FIG. 2, two UAVs may be served by two (e.g., different) USSs and IP connectivity may be provided by an LTE access network. The connection between the UAV and the LTE eNB may be over a wireless medium (e.g., the Uu interface). The connection between the LTE eNB and the USS may be over a wired, routable IP network. Depending on the movement and/or location of a UAV, the communication links between the UAV and the USS may not exist, for example, due to fading of the link and/or the UAV being outside of network coverage.

Automatic dependent surveillance, such as broadcast (ADS-B), may be provided. ADS-B may be used as a surveillance technology. For example, ADS-B may determine an aircraft's position via satellite navigation, and periodically broadcast it. This may enable the aircraft to be tracked by ground based equipment as well as by other aircraft(s) that may receive the broadcast. The transmission may be broadcast and received by a number of recipients. The ADS-B technology may supplement or serve as a replacement for radar, such as secondary radar. The ADS-B technology may not use an interrogation signal from the ground. When received by other aircraft, ADS-B may provide situational awareness and/or may allow separation (e.g., self-separation) among aircraft(s). ADS-B may be spontaneous and/or automatic. ADS-B may not use a pilot and/or an external input. ADS-B may rely on data from the aircraft's navigation system, such as GPS and the like.

ADS-B rebroadcast (ADS-R) may receive position broadcasts from a Universal Access Transceiver (UAT) equipped aircraft and may rebroadcast the position on a frequency. The frequency may be a 1090 MHz frequency. ADS-R may rebroadcast data received on, for example, 1090 MHz or 978 MHz towards a UAT user(s). An aircraft operating on both ADS-B frequencies may identity other aircraft on their tracking displays. This may occur when the other aircraft(s) are within a reception range. Airborne data exchange and ADS-R may provide ADS-B receive function equipped aircrafts with an assessment of surrounding airspace and associated traffic.

A device-to-device (D2D) interface may be provided. For example, the interface may include two proximity services: D2D direct communications and D2D direct discovery. A vehicle-to-vehicle/infrastructure (V2X) may be provided. For example, V2X may direct WTRU-to-WTRU communications, for example, without data transmission on the uplink or the downlink. Direct WTRU-to-WTRU communications may be used for public safety applications and/or V2X. This framework may support one or more WTRUs that are out of coverage, which may be due to network and/or frequency.

Lower layers may define the interface as a Sidelink (SL). The SL may be transmitted by a WTRU, and may be a transmission similar to that on the LTE uplink. The SL may incorporate aspects of the LTE downlink, such as synchronization and control signaling. A WTRU may receive or transmit data on the SL. The SL may incorporate a resource pool, which may define a subset of available subframes and/or resource blocks that may be used, such as for SL transmission and/or reception. SL communication may be half-duplex and a WTRU may be configured with multiple transmit resource pools and/or multiple receive resource pools.

A resource pool may be configured by an eNB and may be signaled to a WTRU. This configuration and signaling may be performed semi-statically. When the WTRU transmits on the SL, transmission resources may be selected from within a resource pool. This selection may be performed using different modes. The modes may include SL Transmission Mode #1 (SL TM #1), where a serving eNB may specify resources via a downlink control information (DCI) format, such as a DCI format 5 message. The DCI format 5 message may be sent to a transmitting WTRU. The modes may include SL Transmission Mode #2 (SL TM #2), where a transmitting WTRU may self-select resources according to one or more rules. The rules may be aimed at minimizing resource collision risk. SL TM #1 may require a WTRU to be (e.g., fully) connected to the network (e.g., RRC_CONNECTED state). SL TM #2 may be used when the WTRU is connected, idle (e.g., RRC_IDLE) or out-of-network coverage state.

A UTM framework may govern UAVs. The UAVs may publish position and intent reports to the UTM system. The position and intent reports may be carried over an access network, such as an LTE network. The position and intent reports may be delivered to the UTM system, which may occur at configured periodicities. UAVs may (e.g., be required by the UTM system to) report event triggered measures, such as a sudden departure from the intended path by a preconfigured margin.

A link between a UAV and an access network may not exist during certain time periods. This may occur when signal-to-noise plus interference ratios (SINR) may be low. This may occur when a UAV is out of network coverage during (e.g., parts of) its mission. If UAVs are reliably tracked by the UTM system, the UTM system may be able to assist with conflict detection as well as conflict alerting. Conflict detection may be the procedure through which UTM network elements may determine that two or more UAVs are in a potential conflict given their current trajectory (e.g., path) based on position and intent reports from one or more UAVs. Conflict alerting may be the procedure through which UTM network elements may indicate to one or more UAVs of an impending conflict. A UTM system may or may not participate in resolving conflicts. A UTM system may or may not participate in the alerting of conflicts.

When UAVs are in the coverage of an access medium, such as LTE, a UTM system may deliver conflict alerts to the UAVs. When a link between the UAV and the UTM system does not exist, which may occur when the UAV is out of network coverage, conflict detection and conflict avoidance may be performed by the UAVs themselves. This may be performed autonomously, for example, using self-contained tools.

A UAV, whose mission may be approved and commenced, may transmit a position report to a UTM. The transmission of the report(s) may be performed at a configured periodicity, which may be indicated by parameter uavPositionReportInterval. For example, a report transmission may occur at 20 second intervals. The position report may be transmitted by the UAV aperiodically, such as at event triggers. For example, when a UAV observes a required navigational performance (RNP) metric drop below a preconfigured threshold, the UAV may trigger an event and may indicate such event to the UTM system via a position report. The report may indicate the departure in RNP, e.g., the drop below the threshold. The UTM system may configure a parameter, uavPositionReportInterval, at the UAV when it approves the mission. The UTM may modify the parameter, uavPositionReportInterval. For example, the UTM may modify the parameter uavPositionReportInterval after a mission has commenced. The position report may be transmitted as an internet protocol (IP) payload with a suitable transport layer, such as UDP or TCP.

A UAV may include its current position information with other data, such as, for example, subsequent intended coordinate way points, measured flight performance metrics, warnings observed, and/or alarms previously raised but yet to be cleared. The current position information may include latitude, longitude, and/or altitude. The UAV's position report may be transmitted over an access media, for example, over the Uu interface using LTE. A UTM client on the UAV may format a position report and may request the access media to transmit the data. In the case where LTE may be used as the access media, the IP packet with the position report may be scheduled for uplink transmission by the eNB on a physical uplink shared channel (PUSCH). The scheduling may be dynamic. For example, an explicit DCI of type format 0 (e.g., DCI format 0) may be issued to a WTRU module within the UAV. The control information may indicate an (e.g., absolute) transmission time, frequency resources and/or a semi-persistently scheduled (SPS) by the eNB for uplink transmission at a predetermined time and a frequency resource. A USS that receives the position report may employ algorithms to determine potential conflicts and/or evaluate a flight conformance based on, for example, preapproved mission parameters.

Figure 3:
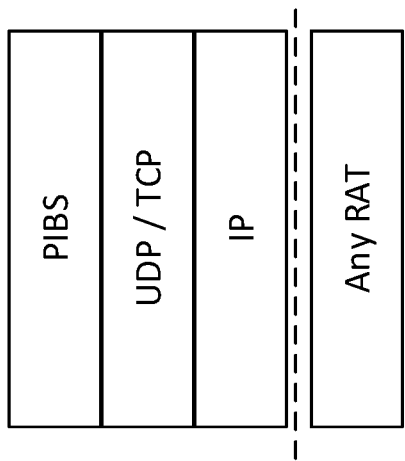
FIG. 3 illustrates an example protocol stack for transmission of a position intent broadcast service (PIBS) message.

A UAV may transmit directly to other UAVs. The transmission may include a report of the UAV's position information. Other UAVs may utilize the reports for conflict detection and/or collision avoidance. A UAV may transmit a PIBS message. The PIBS message may be transmitted at predefined periodicities. Other UAVs in the vicinity, region or area may receive the PIBS message. The periodicity for PIBS messages may be configured by a UTM system via a parameter, such as pibsTransmitInterval. The PIBS transmission periodicity may be scaled as a function of UAV velocity via a parameter, such as pibsTransmitIntervalSpeedScale. The PIBS message may be formatted as an IP packet with a suitable transport layer, such as UDP or TCP. FIG. 3 illustrates an example protocol stack for transmission of a PIBS message. The IP packet may include a PIBS message and may be carried over a RAT, such as LTE, WCDMA, NR, etc.

Figure 4:
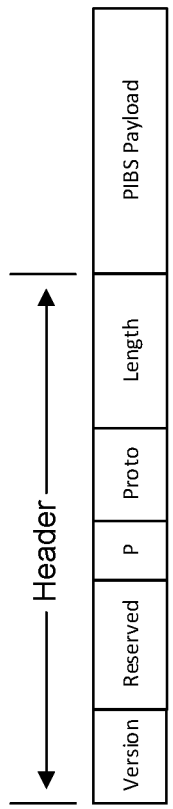
FIG. 4 illustrates an example header and payload of a PIBS message.

FIG. 4 illustrates an example header and payload of a PIBS message. As shown in FIG. 4, the header may include an indication of: a version; a protocol discriminator (proto); a length of the PIBS payload, (length); reserved fields; and/or a priority field (P). The proto field may hold a value, which may indicate if the message is a PIBS message. The P field may refer to a mission priority. The mission priority may be configured by a USS for a UAV as part of a mission approval procedure, which may be prior to the commencement of the mission.

Figure 5:
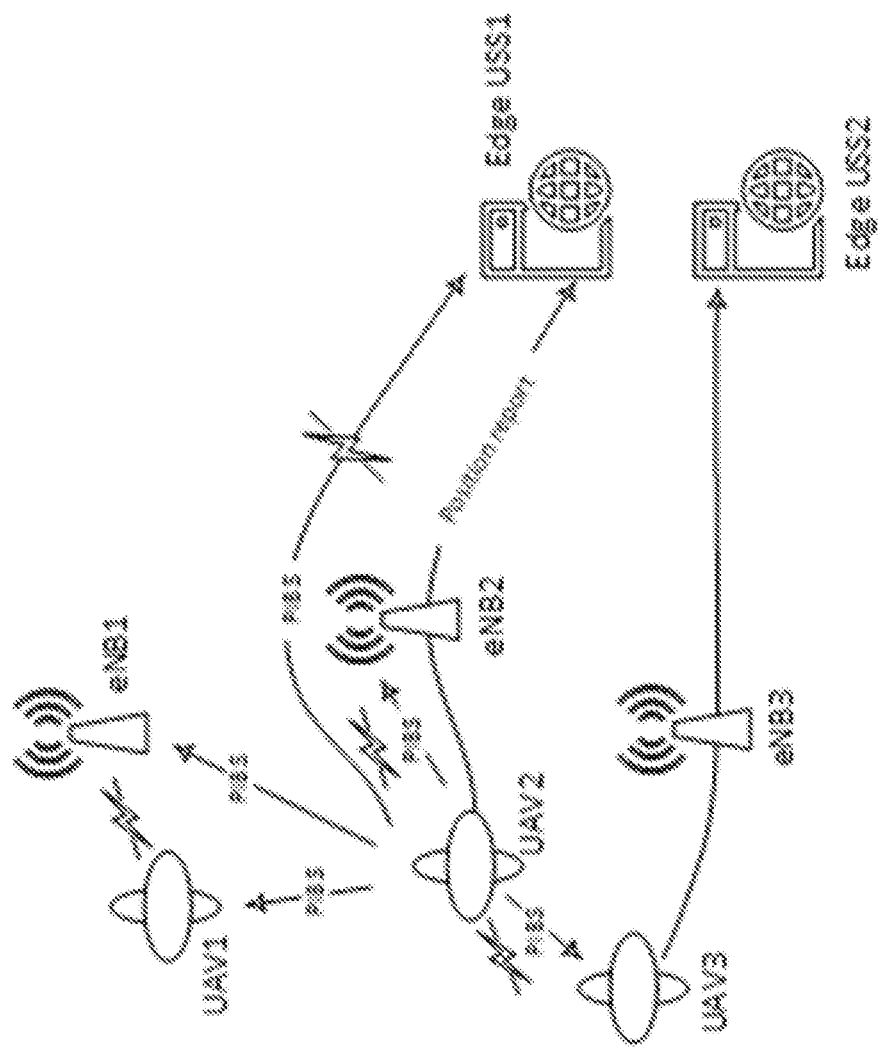
FIG. 5 illustrates an example architecture in which PIBS messages may be transmitted and/or received by one or more UAVs.

A UTM client on a UAV may generate and submit a PIBS message to an access media. The UTM client on the UAV may bind to an IP interface created by the access network. In the case of LTE, the UTM client on the UAV may register a client application for SL services and/or Uu access services. A protocol discriminator field in a PIBS header may indicate to the access network protocol stack that the message may be transmitted over a SL resource. FIG. 5 illustrates an example architecture in which PIBS messages may be transmitted and/or received by one or more UAVs via a configured frequency. A PIBS message transmitted by UAV2 may be received by any receiver that implements a SL receive signal chain. As shown in FIG. 5, UAV1 and UAV3 may participate in SL services and/or may be able to receive a transmission from UAV2. A SL channel may share a portion of an LTE uplink channel and an eNB may implement an uplink signal receive chain. As shown in FIG. 5, eNB1 and eNB2 may receive a PIBS message from UAV2. Edge USS nodes may have receiver functionality. As such, edge USS1 may receive PIBS directly from UAV2.

The frequency on which PIBS messages may be transmitted may be on an operator licensed spectrum, such as spectrum licensed by the Federal Communications Commission (FCC) for commercial cellular services. The frequency on which PIBS messages may be transmitted may be on a dedicated frequency that is allocated for the Federal Aviation Authority (FAA). An operator may choose and operate a SL channel from the unlicensed spectrum. The SL channel may be shared with the operators licensed uplink channel, a channel from the unlicensed spectrum, and/or a dedicated channel. The dedicated channel may be reserved for SL operation. SL resources may be reserved for UAVs and may be location specific. The SL resources may be split or sub-divided into resources. The resources may be usable by UAVs based on the strata and/or altitude they occupy while in flight.

A transmission time of a PIBS message may be configured at the UAV via a parameter, such as pibsTransmitPhase, by the UTM system. The UTM system may determine the pibsTransmitPhase for the UAV. This determination may be performed such that the collision risk due to simultaneous transmission of PIBS messages between two or more UAVs is minimal and/or acceptable. The transmission time may be computed by the UAV, as derived in Eq. (1). A parameter, e.g., pibsSeed, may be configured by the UTM.

$$\text{PIBS transmission time} = \text{pibsTransmitPhase} \bmod(\min(1024, \text{pibsSeed})) \qquad \text{Eq. (1)}$$

In an access network, such as LTE, an eNB may configure the explicit SL resources via a parameter, such as SLresourcePibsDedicated. The parameter may be used by the UAV for transmitting PIBS messages. If a specific SL resource, such as SLresourcePibsDedicated, has been configured, the UAV may use that resource preferentially at the pibsTransmitPhase. A UAV may optimize orthogonalized access to a SLresourcePibsDedicated resource and/or the UAV may spread the pibsTransmitPhase based on a given time and/or location. The UAV's PIBS transmission may not result in a collision.

If SLresourcePibsDedicated and pibsTransmitPhase are configured by a UAV, network nodes may act, for example, as described herein, to ensure collisions between PIBS messages do not probabilistically occur. If explicit SL resources for PIBS messages are not configured by the eNB, the UAV may select the transmission resource. The selection may be performed autonomously and algorithmically, for example, from SL resources configured for general use. For example, the UAV may determine a channel busy ratio (CBR) on a per resource pool basis and may determine which resources may be used for the transmission of PIBS messages. The UAV may compute hybrid automatic repeat requests (HARQ) performance metrics on the SL during its reception opportunities. This may be used to determine which SL resources are (e.g., best) suitable for PIBS messages. The SL resource selection may be subjected to a subset of resources based on the UAV's location and/or the strata occupied by the UAV. If pibsTransmitPhase is not configured, the UAV may attempt to minimize the PIBS transmission collision probability. For example, the UAV may determine the actual PIBS transmission, as derived in Eq. (2).

$$\text{PIBS transmission time} = (\text{current GPS time}) \bmod 1024 \qquad \text{Eq. (2)}$$

If pibsTransmitInterval is not configured, a UAV may set the parameter to a default value, such as 1024 milliseconds. In the case SLresourcePibsDedicated and/or pibsTransmitPhase are not configured at the UAV, the UAV may attempt to retransmit the PIBS message. This may occur if the UAV senses a potential collision. The UAV may employ carrier sensing by means of measuring received signal strength indication (RSSI) or other collision detection mechanisms to determine if a collision may have occurred. If a collision was determined, the UAV may attempt a retransmission of one or more PIBS messages. When the UAV is out of network coverage and/or the density of the UAVs within a given air space is expected to be manageable, SLresourcePibsDedicated and/or pibsTransmitPhase may not be configured.

A payload of a PIBS message may be variable in length and may include one or more parameters. For example, the parameters may include a source ID, which may be an alpha-numeric identifier that uniquely identifies the UAV and may be known by the UTM system. The source ID may be an identity that may be registered with the International Civil Aviation Organization (ICAO). The parameters may include a UAV class, which may be the type or class of UAV that (e.g., unambiguously) identifies the UAV's certified capabilities. The parameters may include a current position, which may be a tuple including latitude, longitude and altitude. The parameters may include a generation time, which may be a time stamp in GPS time format when the PIBS message instance was generated. The parameters may include a heading, which may be one or more subsequent waypoints on an intended trajectory or path expressed as a tuple including latitude, longitude and altitude. The number of such subsequent waypoints to be included in the PIBS message may be configured by the UTM system via a parameter, such as headingReport. This may be configured before the mission commences or during the mission itself. The parameters may include a resolution advisory flag, which may be a boolean parameter indicating whether the UAV is currently seeking or addressing a resolution advisory. The parameters may include an emergency flag, which may be a boolean parameter indicating whether the UAV is currently in an emergent situation.

If the fields resolution advisory flag and emergency flag are both set to false, the UAV may be under normal operation. Under normal operation, a UAV's PIBS message may be transmitted, for example, at an interval, such as the pibsTransmitInterval. A UTM client on the UAV may generate the PIBS message, which may include the contents described herein, and may submit the PIBS message to an access media for transmission at an interval, such as the pibsTransmitInterval.

If either of the resolution advisory flag or the emergency flag are set to true, the UAV may be in operation and may require a conflict to be resolved and/or may need assistance with an emergent situation. If either of the resolution advisory flag or emergency flag are set to true, the transmission of the PIBS message may not be periodic. The contents of a PIBS message may be transmitted as part of a different message, such as a RA-PIBS message. The RA-PIBS message may be transmitted periodically or aperiodically.

A PIBS message that is transmitted by a UAV may have a geographical transmission range. The transmission power and link budgets on the UAV, and/or propagation conditions and obstacles that may exist in the terrain, may determine the reach of a PIBS message from a given UAV. If the PIBS messages are not received by a UTM system or by other UAVs, such as nearby and/or relevant UAVs, a picture surrounding that airspace may not be known in (e.g., full) detail and may not be comprehensive. An eNB and/or USS that may receive the PIBS message from the UAV may synthesize and regenerate the PIBS contents, for example, as a PIBS-R message.

Figure 6:
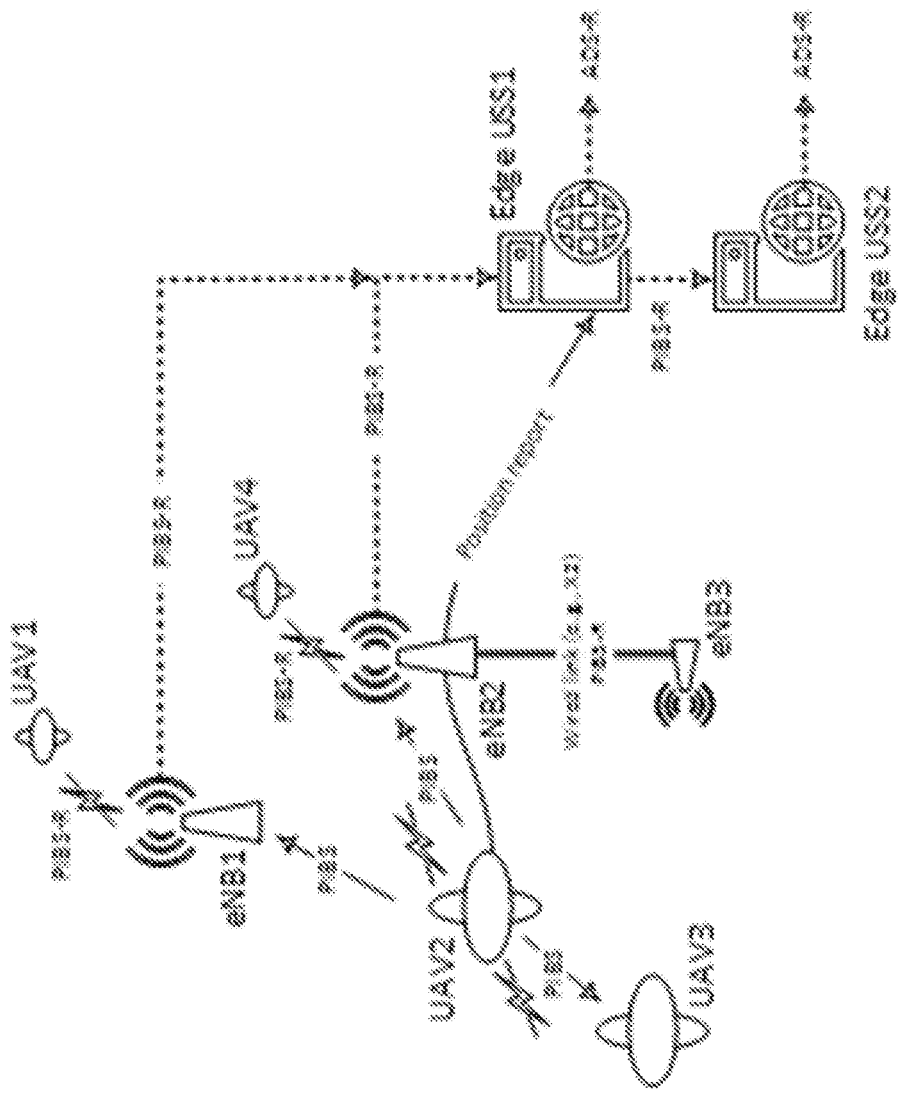
FIG. 6 illustrates an example architecture in which PIBS-rebroadcast (PIBS-R) messages may be transmitted and/or received by one or more eNodeBs (eNBs) and/or one or more USSs.

One or more PIBS messages from one or more UAVs may be synthesized into a single PIBS-R message and may be transmitted by an eNB over an Uu interface and/or over an IP network towards a UTM system. The eNBs may transmit the PIBS-R message to other eNBs over a wired network. This may be an IP interface, which may be proprietary, that may consume IP packets or over an existing X2 interface. One or more PIBS-R messages from one or more eNBs may be synthesized into a single PIBS-R message and may be transmitted by a USS to other USSs over the IP network. FIG. 6 illustrates an example architecture in which PIBS-R messages may be transmitted and/or received by one or more eNBs and/or one or more USSs. The eNB and USS may avoid duplicates before synthesizing and formatting the PIBS-R message.

Figure 7:
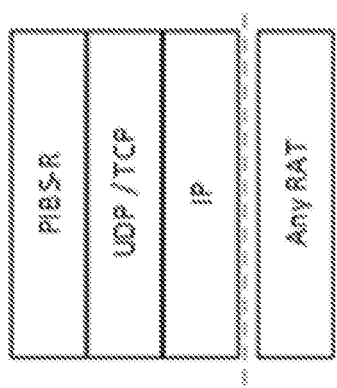
FIG. 7 illustrates an example protocol stack for transmission of a PIBS-R message.

FIG. 7 illustrates an example protocol stack for transmission of a PIBS-R message. The PIBS-R message may be formatted as an IP packet with a suitable transport layer, such as UDP or TCP. The IP packet may include a PIBS-R and may be carried over a RAT such as LTE, WCDMA, NR, etc.

Figure 8:
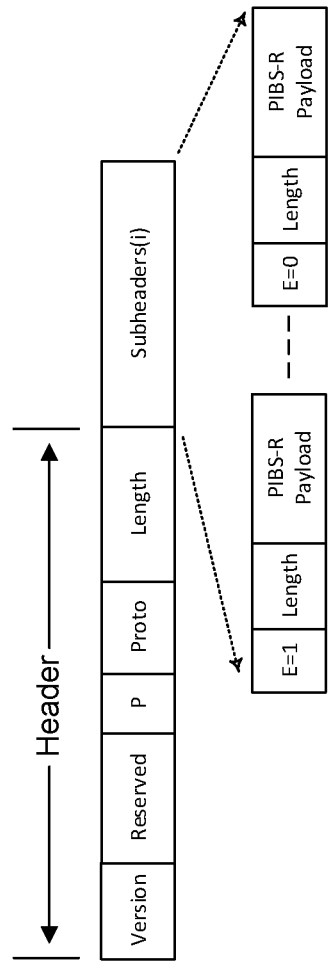
FIG. 8 illustrates an example header and payload of a PIBS-R message.

FIG. 8 illustrates an example header and payload (e.g., subheader) of a PIBS-R message. The header may include one or more of the following: a version; a protocol discriminator (proto); a length of the PIBS-R message composed of sub-headers, (length); reserved fields; and/or a priority field. The proto field may hold a value indicating the message is a PIBS-R message. The P field may refer to a UAV's mission priority. If an eNB or USS is formatting the PIBS-R message, it may set P to 0 (zero), which may reflect the highest possible priority.

A PIBS-R message may include one or more concatenated PIBS messages. Subheaders may be included in the PIBS-R message, which may indicate the number of PIBS-R sub-payloads. The subheader may include an extension bit (E), a length (length), and/or a PIBS-R payload. A PIBS-R payload may correspond to a PIBS payload, as described herein. If an extension bit E is set to 1 in a subheader, a further sub-header may follow after a PIBS-R payload. If the extension bit E is set to 0 (zero) in a subheader, the current subheader may contain the last PIBS-R payload. There may not be a periodicity associated with a PIBS-R message. An eNB and/or a USS may synthesize and transmit a PIBS-R message aperiodically. For example, the eNB and/or the USS may synthesize and transmit a PIBS-R message when it is determined to be necessary and/or appropriate.

On a Uu interface, an eNB may dedicate a set of SL resources, such as SLresourcesPibsRDedicated, for PIBS-R messages. One or more UAVs may be made aware of the SL resources that are meant for their own PIBS messages and/or the SL receive pools that they may monitor. If an eNB dedicates a set of SL resources SLresourcesPibsRDedicated for its PIBS-R messages, it may transmit the PIBS-R message on those resources. If an eNB does not dedicate a set of SL resources SLresourcesPibsRDedicated for its PIBS-R messages, it may transmit the PIBS-R message on a SL transmit resource pool. The eNB may employ carrier sensing and/or collision detection mechanisms to consider retransmissions of PIBS-R messages if it chooses to transmit the PIBS-R message on a common SL resources. On the IP interface, an eNB and/or USS may transmit a PIBS-R message aperiodically, such as when it is determined to be necessary or appropriate. The PIBS-R message may be transmitted to other USSs. A USS that receives the PIBS-R message may validate its contents and/or discard any duplicate PIBS messages (e.g., information that it is already aware of). The USS may propagate the PIBS-R information to other USSs for their consumption. The UTM system may have a consistent view of the airspace they are tasked with managing.

FIG. 6 illustrates an example architecture in which PIBS-R messages may be transmitted and/or received by one or more eNBs and/or one or more USSs over a configured SL frequency. The PIBS message transmitted by UAV2 may be received by a (e.g., any) receiver that implements a SL receive signal chain. As shown in FIG. 6, UAV1, UAV3 and eNB2 may receive the PIBS transmission from UAV2. eNB2 may format and transmit the PIBS-R message to an edge USS1 over a wired IP network, and to eNB3 over a wired IP network, for example using an X2 or over a proprietary interface. A UAV may receive a PIBS-R message from an eNB. As shown in FIG. 6, UAV4 may receive a PIBS-R message from eNB2. A PIBS-R message may be unicast and sent to a particular UAV over the Uu interface. If a PIBS-R message is unicast, the PIBS-R message may be received by a UAV on a physical downlink shared channel (PDSCH) addressed to a cell-radio network temporary identifier (C-RNTI) of a WTRU module on the UAV. The UAV that receives the PIBS-R message on PDSCH may consume the PIBS-R message at the UTM client.

A (e.g., each) subheader in a PIBS-R message may include a PIBS-R payload that may be similar to a PIBS payload. A (e.g., each) PIBS-R payload may be variable in length. An eNB and/or a USS, receiving a PIBS message from a UAV, may not alter the contents of the PIBS message. An eNB and/or a USS, receiving a PIBS message from a UAV, may synthesize the PIBS message into a PIBS-R message in a transparent manner. A USS may receive a position report from a UAV. The USS may synthesize a PIBS-R message using data it captures from the position report and may transmit the PIBS-R message to other USSs. If a USS is unable to determine one or more (e.g. all) the parameters for a PIBS-R message based on a position report, the USS may extrapolate. For example, the USS may attempt to determine the parameter.

Conflict detection may be provided. A UTM system including one or more USSs may have a view of the airspace, the UAVs in that airspace, the missions the UAVs are executing, their current positions, the intended destination and waypoints of those UAVs, and/or the relative separation distances amongst the UAVs. UAV missions may be approved by the UTM system. A mission approval may certify that the flight and operational volume of a UAV may not result in a conflict with other UAVs accepted for operation. The mission approval may consider the geo-airspace overlapping the mission duration. The mission approval may consider external factors, such as changes in weather, wind, and/or emergent flight restrictions, which may influence a departure from a UAV's planned flight path and into another UAV's designed flight path. A UTM system may have a consistent view of the airspace based on position reports from UAVs and/or PIBS-R messages from eNBs and/or other USSs. A USS may determine if two or more UAVs' flight path may be in conflict.

Figure 9:
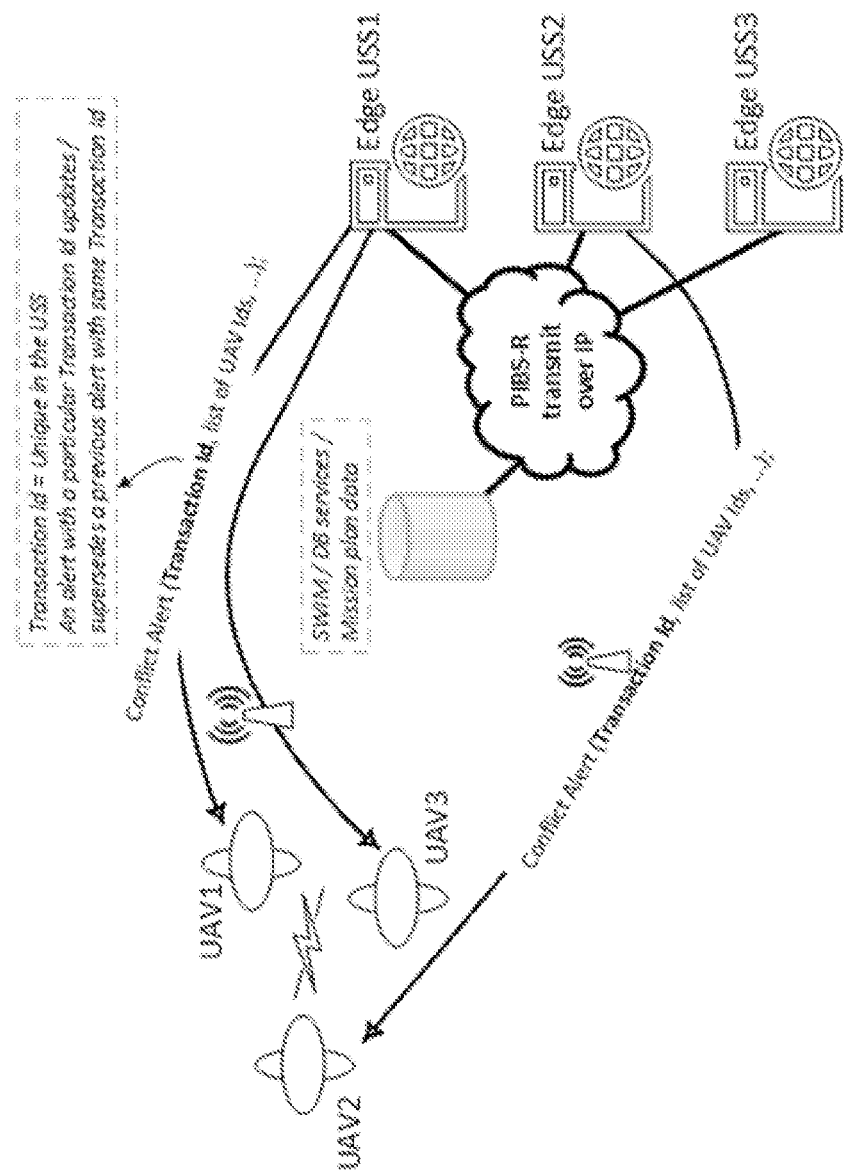
FIG. 9 illustrates an example architecture in which conflict alerts may be communicated from one or more USSs to one or more UAVs.

A USS may determine a (e.g., potential) conflict prior to when the conflict may occur. A USS may not resolve the conflict during a tactical stage. A USS may participate in the alerting of conflicts to relevant UAVs during a tactical stage. FIG. 9 illustrates an example architecture in which conflict alerts may be communicated from one or more USSs to one or more UAVs. As shown in FIG. 9, an edge USS1 may be the serving USS for UAV1 and UAV3. An edge USS2 may be the serving USS for UAV2. The UAV's command and control links may be provided by an access network, such as the LTE radio access network (RAN). The USSs may participate in the exchange of PIBS-R messages with other USSs within the UTM system. The PIBS-R message may be synthesized based on a position report from a UAV, and/or from a PIBS-R message received from an eNB or from another USS. System wide information management (SWIM) databases and data that may exist within the UTM system may be utilized in addition to PIBS-R messages to determine conflicts for one or more UAVs.

When a USS determines a conflict between UAVs, it may assign a transaction identifier and may transmit a conflict alert message. The message may include a transaction identifier, a conflict list, and/or a list of UAV(s) that pose a conflict. The transaction identifier may be unique within the USS and may (e.g., unambiguously) identify a UAV that is managed for a conflict. The transaction identifier may be maintained and reused by the USS for a particular UAV during the (e.g., lifetime) of the conflict, for example, until the conflict is deemed resolved (e.g., completely) at the USS. For example, the USS may determine at instance time=T1 seconds, that a first UAV conflicts with a second UAV. The USS may transmit a conflict alert to the first UAV with a transaction identifier and conflict list indicating the second UAV. If at time=T2 seconds the first UAV is determined to be in an expanded conflict with a third UAV, different to the second UAV monitored at time=T1 seconds, the USS may update the conflict list and transmit a conflict alert message to the first UAV maintaining the same transaction identifier created earlier for the first UAV.

A UAV may not be able to transmit (e.g., reliably) a position report to a USS. This may occur when, for example, a UAV is out of network coverage or when the UAV has encountered a radio link failure. In such a case, a USS may not be able to determine a complete airspace picture sufficiently in time to warn a UAV about an impending conflict.

Figure 10:
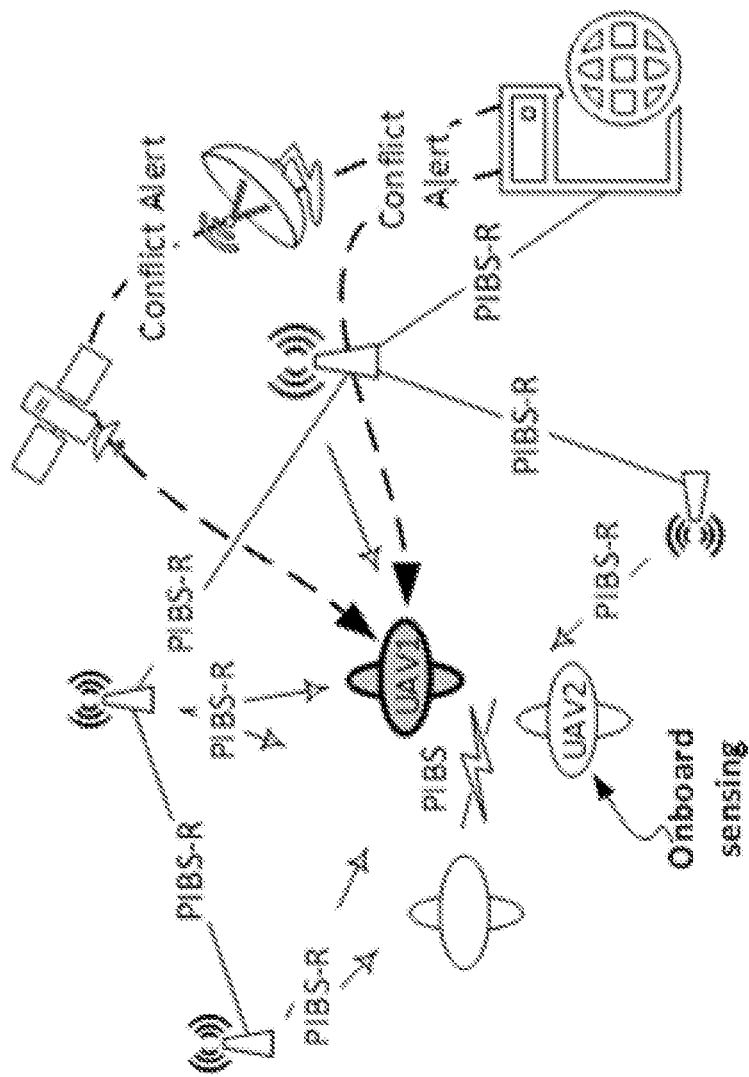
FIG. 10 illustrates an example architecture in which PIBS messages, PIBS-R messages and/or conflict alerts may be communicated.

A UAV may ascertain conflicts with respect to specific UAVs in the airspace from a variety of sources. The UAV may determine a conflict based on one or more of the following: a PIBS message received from one or more UAVs in the vicinity, region or area; a PIBS-R message received from one or more eNBs; onboard sensors such as LiDAR/ RADAR; and/or an (e.g., explicit) conflict alert message from its serving USS. FIG. 10 illustrates an example architecture in which PIBS messages, PIBS-R messages and/or conflict alerts may be communicated. As shown in FIG. 10, UAV1 may be become aware of other UAVs in its airspace by receiving a PIBS message from UAV2, a PIBS-R message from a neighboring eNBs, and/or a conflict alert message from a USS. The conflict alert message may be delivered by a serving USS to UAV1 via a land based cellular system or a satellite link. This may be accomplished by a UAV implementing parallel modems supporting multiple RATs. A conflict may be detected at a UAV by an autonomous means via receptions of PIBS messages, PIBS-R messages from neighboring UAVs and/or eNBs, and onboard sensors the UAV may employ.

When a conflict is (e.g., first) determined by a UAV, the UAV may attempt to resolve the conflict by forming a cluster with the other UAV(s) associated with the conflict. When a UAV detects a conflict for the first time, the UAV may enter a resolution advisory (RA) formation phase or period. FIG. 11 illustrates example formation and resolution periods for conflict detection and avoidance. As shown in FIG. 11, during the RA formation phase, a UAV 0x1234 may transmit an RA-PIBS message, which may signal UAV 0x1234's intent to form a cluster with other UAVs that UAV 0x1234 identifies as conflict or collision risks. The RA-PIBS message may be transmitted by UAV 0x1234 at a periodicity configured by a UTM system. This may be indicated by a parameter, such as raPibsTransmitInterval. The RA-PIBS message periodicity may be scaled based on UAV velocity via a parameter, such as raPibsTransmitSpeedScale. The RA-PIBS message may be formatted as an IP packet with a suitable transport layer, such as UDP or TCP. FIG. 12 illustrates an example protocol stack for transmission of a RA-PIBS message. The IP packet containing the RA-PIBS message may be carried over a suitable RAT, such as LTE, WCDMA, NR, and the like.

FIG. 13 illustrates an example header and payload of a RA-PIBS message. The header may include: a version; a protocol discriminator (proto); a length of the RA-PIBS payload, (length); reserved fields; and/or a priority field (P). The proto field may hold a value indicating the message is a RA-PIBS message. The length field may indicate the size of a subheader in the RA-PIBS message. The subheader may include a reserved field and the (e.g., actual) RA-PIBS payload. The P field may refer to the mission priority that is configured by a USS for a UAV as part of the mission approval procedure prior to the commencement of the mission.

A UTM client on a UAV may generate and submit a RA-PIBS message to an access network. The UTM client on the UAV may bind to an IP interface created by the access network. In an access network, such as LTE, the UTM client on the UAV may register the client application for SL services and/or Uu access services. The proto field in the RA-PIBS message header may indicate to the access network protocol stack that the message may be transmitted over a SL resource.

Figure 14:
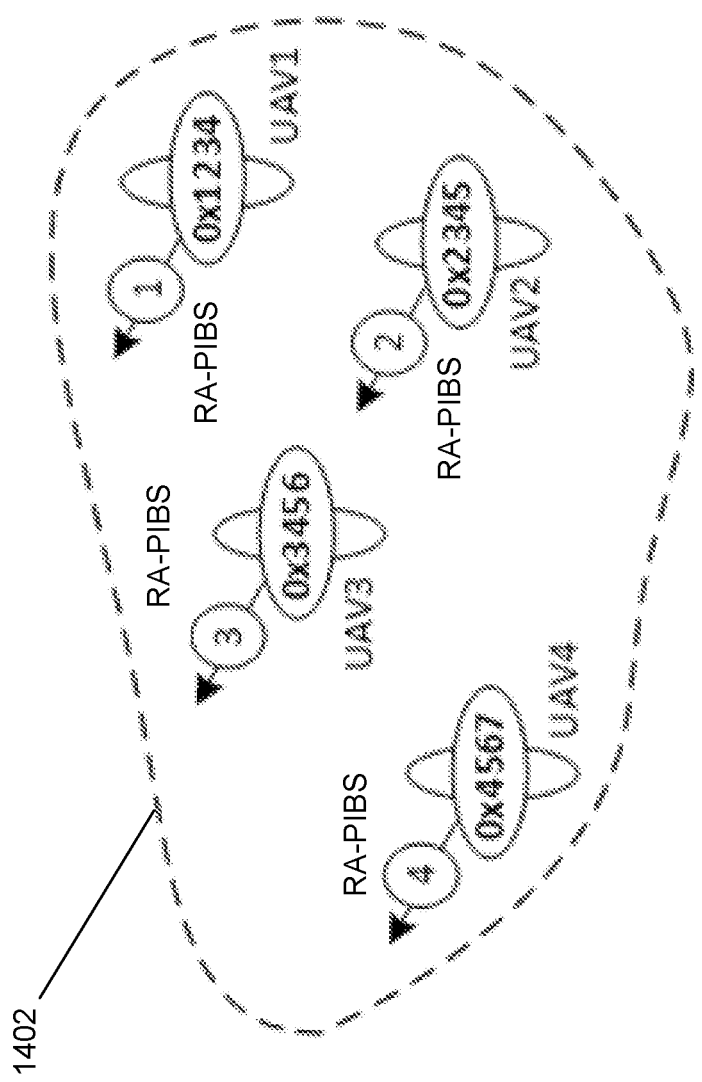
FIG. 14 illustrates an example communication of RA-PIBS messages between UAVs.

FIG. 14 illustrates an example communication of RA-PIBS messages between UAVs. As shown in FIG. 14, UAV1, UAV2, UAV3 and/or UAV4 may transmit RA-PIBS messages 1, 2, 3 and 4, respectively. The RA-PIBS message 1, 2, 3 and 4 may be received, read and deciphered by one or more of the UAVs in an area 1402. For example, UAV3 may receive the RA-PIBS messages 1, 2 and 4 transmitted by UAV1, UAV2 and UAV4, respectively. As further noted below, portions of the contents of the RA-PIBS messages 1, 2, 3 and 4 may be the same or different.

A RA-PIBS message from a UAV may be transmitted on a frequency, which may be configured. In an access network, such as LTE, the UAV may transmit a RA-PIBS message on an SL resource or channel. The frequency on which RA-PIBS messages may be transmitted may include operator licensed spectrum, such as spectrum licensed by the FCC for commercial cellular services. The frequency on which RA-PIBS messages may be transmitted may include a dedicated frequency, such as spectrum that is allocated for the FAA. An SL channel may be shared with an operator's licensed uplink channel or a dedicated channel reserved only for SL operation. SL resources may be reserved for UAVs and/or may be location specific. SL resources may be split or sub-divided into resources. The resources may be usable by a UAV based on the strata or altitude the UAV occupies while in flight.

A transmission time of a RA-PIBS message may be configured by the UTM system for a UAV via a parameter, such as raPibsTransmitPhase. The UTM system may determine the raPibsTransmitPhase for the UAV such that the collision risk due to simultaneous transmissions of RA-PIBS messages between two or more UAVs is minimal and/or acceptable. The transmit time of the RA-PIBS message may computed by the UAV, as derived in Eq. (3).

$$\text{RA PIBS transmission time} = \text{rapibsTransmitPhase} \mod \min(64, \text{rapibsSeed}) \quad \text{Eq. (3)}$$

In an access network, such as LTE, an eNB may configure an (e.g., explicit) SL resource via a parameter, such as SLresourceRaPibsDedicated. The parameter may be used by a UAV for transmitting RA-PIBS messages. If a specific SL resource, for example, SLresourceRaPibsDedicated, has been configured, the UAV may use that resource preferentially at the raPibsTransmitPhase. UAVs may have orthogonalized access to SLresourceRaPibsDedicated resources. The raPibsTransmitPhase may be uniformly spread given the time and location. The probability of RA-PIBS transmission resulting in collision may be minimized. If SLresourceRaPibsDedicated and RapibsTransmitPhase are configured at a UAV, network nodes may attempt to ensure that collisions between RA-PIBS messages do not probabilistically occur.

If SL resources for RA-PIBS messages are not configured by an eNB, a UAV may select a transmission resource. The UAV may autonomously and/or algorithmically select SL resources that may be configured for general use. For example, the UAV may determine a CBR on a per resource pool basis and/or may determine which resources are most likely optimal for RA-PIBS messages. The UAV may compute HARQ performance metrics on a SL during its reception opportunities, which may determine which SL resources are optimally suitable for RA-PIBS messages. SL resource selection may be subjected to a subset of resources based on UAV's location and/or the strata occupied by the UAV.

If raPibsTransmitPhase is not configured, a UAV may attempt to minimizes the probability of RA-PIBS message collisions. For example, the UAV may determine the actual RA PIBS transmission time as derived in Eq. (4).

$$\text{RA PIBS transmission time} = (\text{current GPS time}) \mod 64 \quad \text{Eq. (4)}$$

If raPibsTransmitInterval is not configured, a UAV may apply a default value, such as 64 milliseconds, for that parameter. If SLresourceRaPibsDedicated and/or raPibsTransmitPhase are not configured at a UAV, the UAV may attempt to retransmit the RA-PIBS message. A retransmission may be performed if the UAV senses a collision. The UAV may employ carrier sensing. Carrier sensing may be performed by measuring RSSI or other collision detection mechanism to determine if a collision may have occurred. If a collision was detected, the UAV may attempt a retransmission of the RA-PIBS message. SLresourceRaPibsDedicated and/or raPibsTransmitPhase may not be configured when, for example, the UAV is out of network coverage. If the UAV is out of network coverage, the density of UAVs within a given air space may be manageable. The probability of a RA-PIBS transmissions collision may be reduced and/or minimal.

A RA-PIBS payload may be variable in length. The RA-PIBS payload may include one or more parameters. The parameters may include a source ID, which may be an alpha-numeric identifier that may identify the UAV and may be known by the UTM system. The parameters may include a cluster ID, which may be an unique alphanumeric identifier generated by a UAV before its (e.g., first) transmission of a RA-PIBS message. A UAV may be identified by its source ID and/or by its cluster ID. For example, the cluster ID may be derived as an alpha-number string incorporating a source ID and a monotonically increasing local identifier tracking its conflicts. The parameters may include an RA phase, which may be set to formation when the RA-PIBS message is (e.g., first) transmitted and to resolution when a cluster head has been determined and/or a cluster head has transmitted a resolution, for example. The parameters may include a PIBS message, which may include position intent broadcast service data as described herein. The parameters may include a priority, which may be the priority of a UAV set by a UTM system at the time of mission approval. The parameters may include an RA-list, which may be an array of UAVs with which the transmitting UAV is requesting conflict resolution. The parameters may include an RA-resolutions, which may be an array of resolutions determined for one or more UAVs in the RA-list. The parameters may include a cluster head bid bit (CHBidBit), which may be a boolean set to true or false depending on whether the UAV is requesting permission to be a cluster head. The parameters may include a cluster head bit, which may be a boolean set to true (e.g., 1) if the transmitting UAV is decided to be the cluster head, else it may be set to false (e.g., zero). The parameters may include a tie break bit, which may be a boolean that may be uniformly or randomly set if the cluster head bit is set to true (e.g., 1), else it may be set to false (e.g., zero). The tie break bit may be used to decide on the cluster head if multiple UAVs have their cluster head bid bit set to true. The parameters may include a generation time, which may be a time stamp that refers to when a RA formation timer expires. It may be set to a value, such as GPS time+RaFormationTime, at the first (e.g., earliest) transmission of a RA-PIBS message. The generation time may not be modified for a given cluster. The GPS time may refer to the GPS time format. A parameter RaFormationTime may be configured by the UTM system.

If parameter RaFormationTime is not configured by the UTM system, it may be set to a default value, such as 5000 milliseconds. If a UAV determines that a conflict with another UAV exists and it chooses to transmit a RA-PIBS message, it may set the resolution advisory flag to true in its PIBS message. The PIBS message (e.g., from this point onwards) may be quasi-periodic. For example, the PIBS message may not be transmitted every pibsTransmitInterval. The contents of the PIBS message may be transmitted as part of the RA-PIBS message, for example, at least with periodicity raPibsTransmitInterval as described herein.

As shown in FIG. 14, UAV1, UAV2, UAV3 and UAV4 may have a source ID of 0x1234, 0x2345, 0x3456 and 0x4567, respectively. When a UAV receives one or more PIBS messages and determines a need to transmit a RA-PIBS message (e.g., because of a detected conflict), it may format a RA-PIBS message with contents as described herein. For example, the RA-PIBS message may include the list of other UAVs with which the source UAV perceives a conflict. The UAV may set the field generation time to a value, such as current GPS time+RaFormationTime. This may indicate the end time of the formation phase or period and/or when a resolution advisory phase or period may begin. The UAV may form a unique cluster ID, for example, by incorporating its source ID and a monotonically incrementing count for conflicts encountered.

A UAV may choose to set the cluster head bid bit field to true. It may do so if, for example, the UAV determines it has a greater computing capacity, which may depend on its CPU capability. If the UAV sets its cluster head bid bit field to true (e.g., 1), the UAV may (e.g., uniformly) select a value of true or false and may set it as the tie Break bit field. In the RA-list field, the UAV may include a list of other UAVs' source IDs with which it requires conflict resolution. The RA-PIBS message may be transmitted by a UAV periodically and its contents may be updated depending on one or more RA-PIBS messages it may receive from other UAVs. The UAV may set the RA phase field set to a RA formation in a (e.g., first) instance.

TABLE 1

| Content | Updates | Values |
| --- | --- | --- |
| Source Id | No | |
| Cluster Id | Yes | Alpha numeric |
| RA Phase | Yes | 0/1 = Form/Resolve |
| PIBS | Yes | |
| RAList[ ] | Yes | |
| Priority | No | (1:N) |
| CHBit | Yes | 0/1 = T/F |
| CHBidBit | Yes | 0/1 = T/F |
| TieBreakBit | Yes | 0/1 set/unset |
| Generation Time | No | |

Table 1 illustrates the content of an example RA-PIBS message, which may be subject to change over time. As shown in Table 1, the middle column, updates, may indicate which parameter of a RA-PIBS message may be subject to change. For example, the source ID, priority and/or generation time fields in a RA-PIBS may not change after the (e.g., first) RA-PIBS message is generated. The remaining content(s) may be subject to change depending on information a UAV may receive from other UAVs' RA-PIBS messages.

FIG. 15 illustrates example RA-PIBS messages from four UAVs with different source IDs, such as 0x1234, 0x2345, 0x3456 and 0x4567. As shown in FIG. 15, each RA-PIBS message may include a source ID, a cluster ID, RA-List, priority, cluster head bid bit (CHBidBit) and/or a tie break bit (TieBreak). In an iteration (e.g. a first iteration) of RA-PIBS messages, UAV1 (with source ID 0x1234) may determine a cluster ID of 0x123401, which may be its own source ID concatenated with 0x01. UAV 0x1234 may include UAVs 0x2345 and 0x3456 in the RA-list field, which may reflect a determination by the UAV and/or a network node (e.g., UTM system, USS, etc.) that a conflict may exist between UAVs 0x1234, 0x2345 and/or 0x3456 (e.g., a conflict between 0x1234, 0x2345 and a conflict between 0x1234, 0x3456) and that a conflict resolution is being sought. As such, one or more (e.g. each) of the respective trajectories (e.g., flight paths) of UAVs 0x1234, 0x2345 and/or 0x3456 may conflict with at least one of the other respective trajectories. For example, the trajectory of UAV 0x1234 may conflict with the respective trajectories of UAVs 0x2345, 0x3456.

The priority field in UAV 0x1234's RA-PIBS message may be set to 1, a value which may be set by a UTM system during the mission approval procedure. The UAV 0x1234 may decide to bid to become the cluster head and may set field cluster head bid bit (CHBidBit) to true (e.g., 1). The UAV 0x1234 may draw a uniform random number to set the tie break bit field. FIG. 15 further illustrates the contents of RA-PIBS messages from UAVs 0x2345, 0x3456 and 0x4567. At least a portion of the conflicts reflected in the RA-lists may be orthogonal. For example, UAV 0x2345 may see a conflict with UAVs 0x1234 and 0x3456 while UAV 0x3456 may see a conflict with UAVs 0x2345 and 0x4567. A first UAV, that may not directly note a conflict with a third UAV, may actually be in a cascaded conflict through a second UAV. For example, UAV 0x4567 may see a conflict with UAV 0x3456 and, as such, may have a cascaded conflict with UAV 0x2345. The UAV 0x1234 may see UAV 0x3456 as a direct conflict, as indicated through the RA-list sent by 0X1234. The UAV 0x3456 may not see 0x1234 as a direct conflict but rather as a cascaded conflict through the UAV 0x2345.

During a (e.g., first) transmit opportunity, a first UAV may transmit a PIBS message or a RA-PIBS message. The RA-PIBS message may have a higher precedence. During a (e.g., first) read opportunity, the first UAV may attempt to read a PIBS message or a RA-PIBS message transmitted by other UAVs. By reading the RA-list field in the RA-PIBS message transmitted by other UAVs, the first UAV may determine that one or more other UAVs have indicated the first UAV is in conflict (e.g., has a conflicting trajectory). The first UAV may update its conflicts list. If a RA-PIBS message is received from a second UAV by the first UAV with an RA-list field indicating first UAV in conflict and if a priority of the second UAV is greater than the priority of the first UAV, the first UAV may forego its cluster head bid during an RA phase, which may be set to formation. As such, the first UAV may discard its cluster ID and may inherit or assume the cluster ID of the second UAV. If the first UAV and the second UAV have equal priorities, the tie break bit may be used to determine the cluster head and/or cluster ID.

Figure 16:
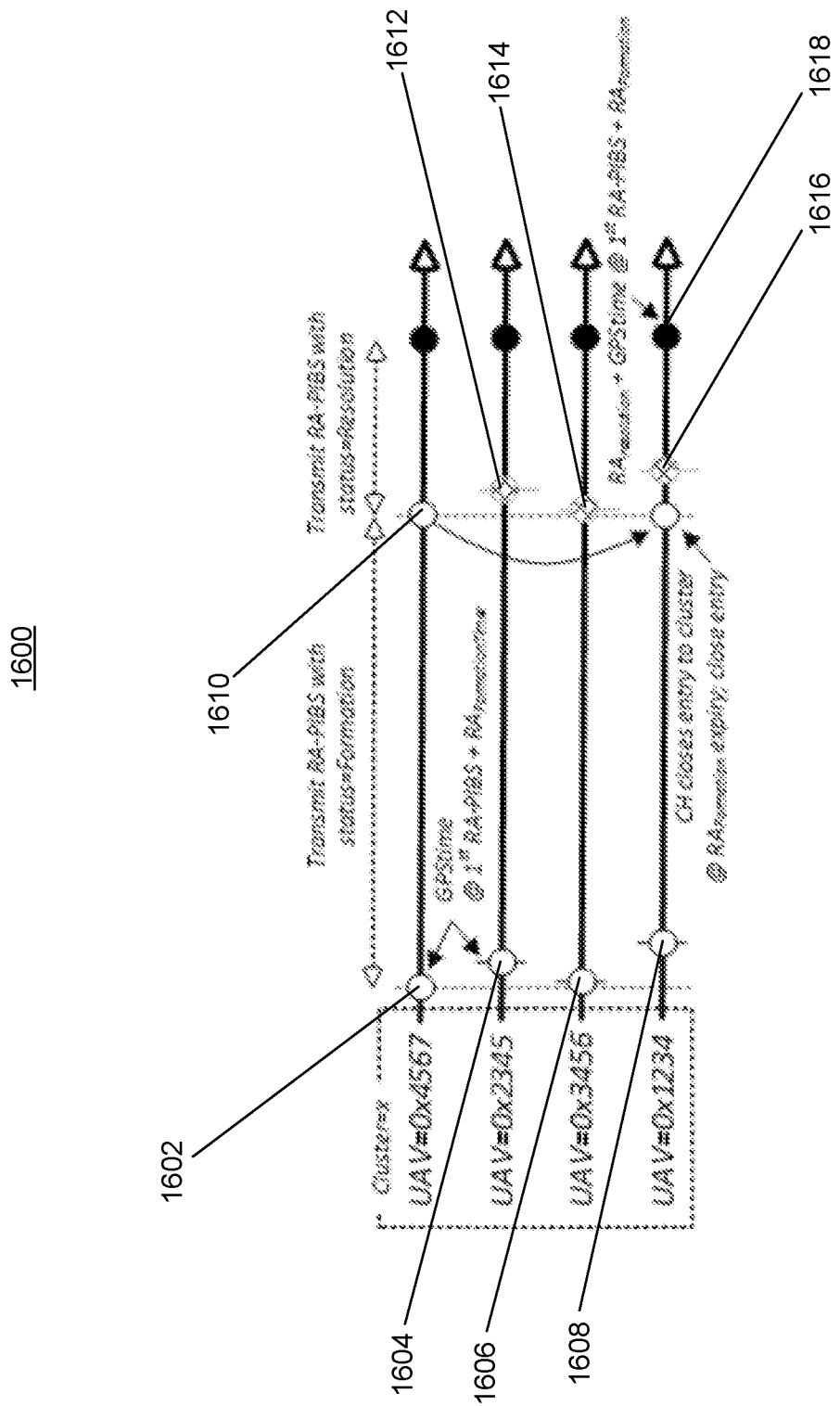
FIG. 16 illustrates an example formation and resolution period for a cluster of UAVs.

FIG. 16 illustrates example formation and resolution phases during a time period 1600. The time period 1600 may include an RA formation phase or period and a RA resolution phase or period. As shown in FIG. 16, UAV 0x4567 may transmit an RA-PIBS message at 1602. UAV 0x2345 may transmit a RA-PIBS message at 1604. UAV 0x3456 may transmit a RA-PIBS message at 1606. UAV 0x1234 may transmit a RA-PIBS message at 1608. As shown, the RA-PIBS message from UAV 0x4567 at 1602 may be the first RA-PIBS message to be transmitted during the time period 1600 and may represent the beginning of the RA formation phase. The RA-PIBS message at 1602 may be followed by the RA-PIBS message at 1606, followed by the RA-PIBS message at 1604, followed by the RA-PIBS message at 1608. The RA formation phase may continue for a time period or duration, which may correspond to the RaFormationTime and/or the time duration for the UAVs to have the same view of their respective priorities in the cluster (e.g., the time duration for the UAVs to exchange their respective priorities). At the end or expiration of the time period or duration (e.g., at 1610), one or more aspects of the cluster x (e.g., a number of UAVs in the cluster, the source IDs of the UAVs in the cluster, the cluster ID, the cluster head, etc.) may be determined. UAVs 0x2345, 0x3456 and/or 0x1234 may transmit RA-PIBS messages at 1612, 1614, 1616, respectively, which may occur after the expiration or end of the RaFormationTime. As such, the RA-PIBS messages at 1612, 1614, 1616 may not change the determined aspects of the cluster x. The RA-PIBS at 1612, 1614, 1616 may start another RA formation phase for another cluster.

Following the RA formation phase shown in FIG. 16, the RA resolution phase may begin. During the RA resolution phase, the cluster head of a cluster may determine one or more resolutions to address one or more conflicts associated with the cluster. For example, UAV 0x1234 may determine that it is the cluster head based on its priority and the priorities included in the RA-PIBS messages from UAVs 0x2345, 0x3456 and 0x4567. As such, UAV 0x1234 may transmit one or more resolutions at 1618, for example, that may address the one or more conflicts associated with the cluster x.

If a first UAV (e.g., UAV 0x1234) receives a RA-PIBS message from a second UAV (e.g., UAV 0x3456) with a RA list field that includes one or more UAV source IDs not within its own RA-list, the first UAV may seek to form a union of UAVs (e.g., a cluster) requiring a resolution advisory with itself and the other UAVs during a RA formation phase. After receiving one or more RA-PIBS messages from one or more other UAVs, the first UAV may transmit a (e.g., second) RA-PIBS message with an updated RA-list, updated cluster ID and/or updated cluster head bid bit. The tie break bit field may be drawn (e.g., again) randomly. During the RA formation phase, the UAVs that receive a RA-PIBS message may update the contents of their respective RA-PIBS messages, as described herein, and transmit them at their respective RA-PIBS transmission opportunities.

Figure 17:
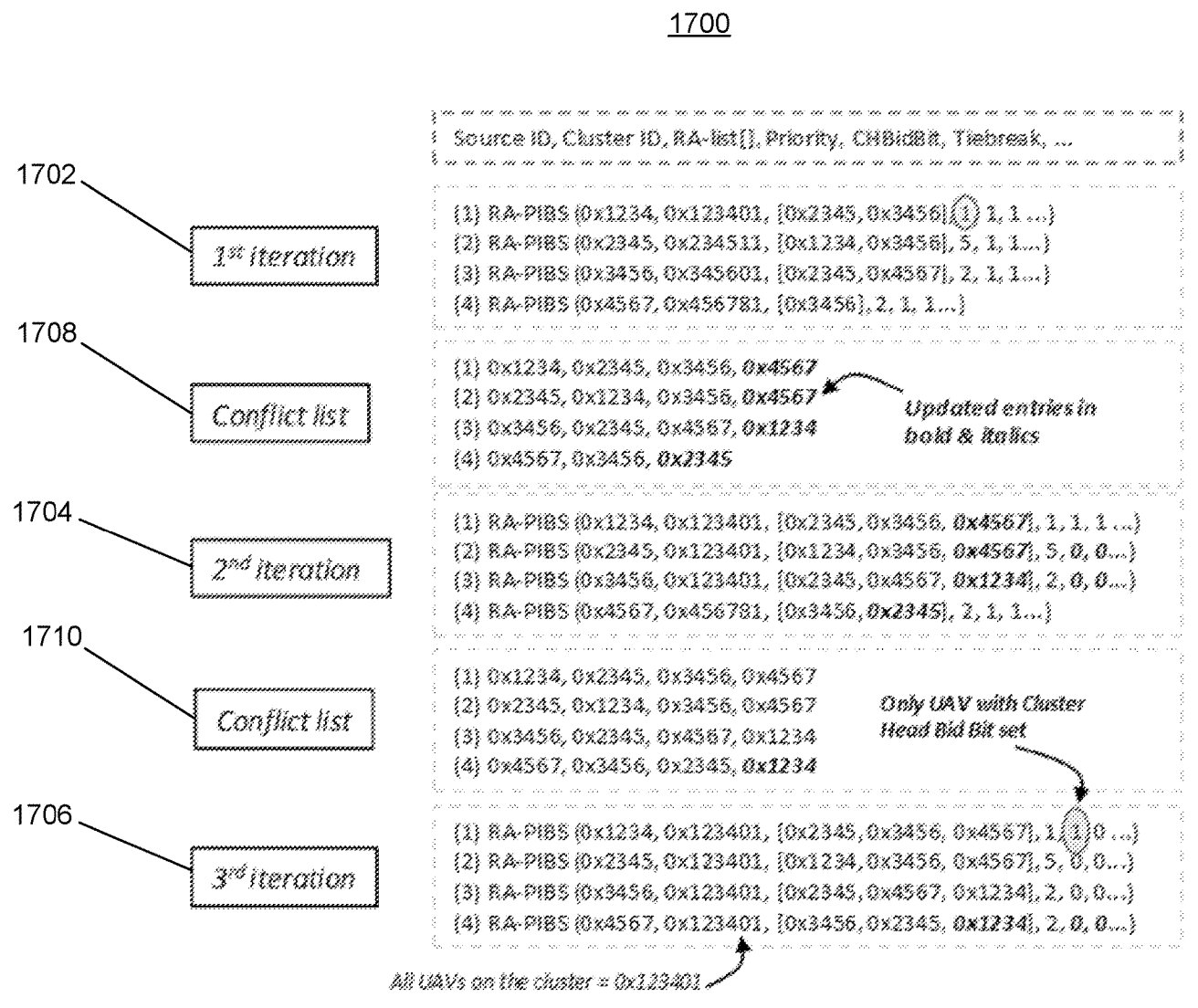

FIG. 17 illustrates an example iteration 1700 of RA-PIBS messaging from UAVs, which may facilitate the formation of a cluster and the determination of a cluster head to resolve one or more conflicts associated with the cluster. The iteration 1700 may include a first iteration 1702, a second iteration 1704 and a third iteration 1706 of RA-PIBs messages from UAVs 0x1234, 0x2345, 0x3456 and 0x4567. Following the first iteration 1702, a conflict list 1708 may be updated. Following the second iteration 1704, a conflict list 1710 may be updated. The conflict lists 1708, 1710 may reflect the (e.g., updated) respective RA-lists of UAVs 0x1234, 0x2345, 0x3456 and 0x4567 after the iterations 1702, 1704.

As shown in FIG. 17, during the first iteration 1702, UAVs 0x1234, 0x2345, 0x3456 and 0x4567 may each transmit a RA-PIBS message. A RA-PIBS message may include source ID, a cluster ID, a RA-List, a priority bit/field, a CHBidBit, a tiebreak bit, or the like. The RA-PIBS message from UAV 0x1234 may include: a source ID set to 0x1234; a cluster ID set to 0x123401; an RA-list set to 0x2345, 0x3456; a priority bit/field set to 1; a CHBidBit set to 1; and/or a tiebreak bit set to 1. The RA-PIBS message from UAV 0x2345 may include: a source ID set to 0x2345; a cluster ID set to 0x234511; an RA-list set to 0x1234, 0x3456; a priority bit/field set to 5; a CHBidBit set to 1; and/or a tiebreak bit set to 1. The RA-PIBS message from UAV 0x3456 may include: a source ID set to 0x3456; a cluster ID set to 0x345601; an RA-list set to 0x2345, 0x4567; a priority bit/field set to 2; a CHBidBit set to 1; and/or a tiebreak bit set to 1. The RA-PIBS message from UAV 0x4567 may include: a source ID set to 0x4567; a cluster ID set to 0x456781; an RA-list set to 0x3456; a priority bit/field set to 2; a CHBidBit set to 1; and/or a tiebreak bit set to 1.

UAVs 0x1234, 0x2345, 0x3456 and 0x4567 may receive one another's RA-PIBS messages and may update their respective RA-lists accordingly. For example, UAV 0x1234 may receive the RA-PIBS messages from UAVs 0x2345, 0x3456 and/or 0x4567. The RA-PIBS message from UAV 0x2345 may include a RA-list that identifies UAVs 0x1234 and 0x3456. As the RA-list for UAV 0x1234 already identified UAVs 0x2345 and 0x3456, the RA-PIBS from UAV 0x2345 may not result in changes to the RA-list for UAV 0x1234. The RA-PIBS message from UAV 0x3456 may include an RA-list that identifies UAV 0x0x2345 and 0x4567. As shown in FIG. 17, UAV 0x4567 may not be included in the RA-list for UAV 0x1234 during the first iteration 1702. As such, the UAV 0x1234 may update its RA-list to reflect the conflict with UAV 0x4567, which may represent a secondary conflict in that UAV 0x4567 may be in conflict with UAV 0x3456, which may be in conflict with UAV 0x1234.

The foregoing may be carried out by UAVs 0x2345, 0x3456 and/or 0x4567. The conflict list 1708 reflects the updated conflicts list of UAVs 0x1234, 0x2345, 0x3456 and 0x4567 following the first iteration 1702 of RA-PIBS messages. The changes are shown in bold italics. The updated conflicts list may be reflected in the RA-lists of the respective RA-lists for UAVs 0x1234, 0x2345, 0x3456 and 0x4567 during subsequent iterations.

During the second iteration 1704, UAVs 0x1234, 0x2345, 0x3456 and 0x4567 may each transmit another RA-PIBS message, which may include an (e.g., updated) RA-list as reflected in the conflict list 1708. The RA-lists for UAVs 0x1234 and 0x2345 may include newly added UAV 0x4567. The RA-list for UAV 0x3456 may include newly added UAV 0x1234. The RA-list for UAV 0x4567 may include newly added UAV 0x2345.

The RA-PIBS messages in the second iteration 1704 may include other updates, such as updates to the cluster ID, the cluster head bid bit (CHBidBit) and/or the tie break bit (TieBreak). For example, during the first iteration 1702, the RA-PIBS messages from each of UAVs 0x1234, 0x2345, 0x3456, 0x4567 may include a CHBidBit set to 1, which may indicate a bid to become a cluster head. The priority bits in the RA-PIBS messages may indicate that UAVs 0x1234, 0x2345, 0x3456, 0x4567 have priorities of 1, 5, 2 and 2, respectively. Following the first iteration 1702, UAV 0x1234 may include UAVs 0x2345, 0x3456 and 0x4567 in its RA-list. The priority of UAV 0x1234 (e.g., 1) may be higher than the respective priorities of UAVs 0x2345 (e.g., 5), 0x3456 (e.g., 2) and 0x45657 (e.g., 2). As such, UAV 0x1234 may retain its bid to become the cluster head. For example, during the second iteration 1704, the CHBidBit in the RA-PIBS message from UAV 0x1234 may remain set to 1, the cluster ID may remain set to 0x123401 and/or the tie break bit may remain set to 1.

Following the first iteration 1702, UAV 0x2345 may include UAVs 0x1234, 0x3456 and 0x4567 in its RA-list. The priority of UAV 0x2345 (e.g., 5) may be lower than the respective priorities of UAVs 0x1234 (e.g., 1), 0x3456 (e.g., 2) and 0x45657 (e.g., 2). As such, UAV 0x2345 may release its bid to become the cluster head. For example, during the second iteration 1704, the CHBidBit in the RA-PIBS message from UAV 0x2345 may be set to 0 (zero), the cluster ID may be changed from 0x234511 to 0x123401 and/or the tie break bit may be set to 0 (zero).

Following the first iteration 1702, UAV 0x3456 may include UAVs 0x1234, 0x2345 and 0x4567 in its RA-list. The priority of UAV 0x3456 (e.g., 2) may be higher than the priority of UAV 0x2345 (e.g., 5) and the same as the priority of UAV 0x4567 (e.g., 2), but lower than the priority of UAV 0x1234 (e.g., 1). As such, UAV 0x3456 may release its bid to become the cluster head. For example, during the second iteration 1704, the CHBidBit in the RA-PIBS message from UAV 0x3456 may be set to 0 (zero), the cluster ID may be changed from 0x345601 to 0x123401 and/or the tie break bit may be set to 0 (zero).

Following the first iteration 1702, UAV 0x4567 may include UAVs 0x2345 and 0x3456 in its RA-list. The priority of UAV 0x4567 (e.g., 2) may be higher than the priority of UAV 0x2345 (e.g., 5) and the same as the priority of UAV 0x3456 (e.g., 2). The tiebreak bits in the RA-PIBS messages of UAVs 0x3456 and 0x4567 may each be set to 1, which may preclude the UAV 0x4567 from determining a tiebreak after the first iteration 1702. As such, UAV 0x4567 may retain its bid to become the cluster head. For example, during the second iteration 1704, the CHBidBit in the RA-PIBS message from UAV 0x4567 may remain set to 1, the cluster ID may remain set to 0x456781 and/or the tie break bit may remain set to 1. In the event the tiebreak bits in the RA-PIBS messages of UAVs 0x3456 and 0x4567 are different, UAV 0x4567 may determine to retain its bid to become cluster head (e.g., after winning the tiebreak) and/or release its bid to become cluster head (e.g., after losing the tiebreak). A winning tie break bit may be the highest value of the tie break bits or the lowest value of the tie break bits.

Following the second iteration 1704 of RA-PIBS messages, UAVs 0x1234, 0x2345, 0x3456 and/or 0x4567 may update one or more parameters reflected in their respective RA-PIBS messages. As shown in the conflict list 1710, the RA-lists for UAVs 0x1234, 0x2345 and 0x3456 may remain unchanged as the second iteration 1704 may not result in the identification of any new UAVs posing a conflict. Following the second iteration 1704, UAV 0x4567 may identify UAV 0x1234 as a conflict given that it appears on the RA-lists of UAVs 0x2345 and 0x3456. As such, UAV 0x4567 may update its RA-list as reflected in the conflict list 1710. With the addition of UAV 0x1234 to its RA-list, UAV 0x4567 may update its cluster ID, CHBidBit and/or the tie break bit. For example, UAV 0x4567 may have a priority (e.g., 2) that is lower than the priority of UAV 0x1234 (e.g., 1). As such, following the second iteration 1704, UAV 0x4567 may release its bid to become cluster head. During the third iteration 1706, the CHBidBit in the RA-PIBS message from UAV 0x4567 may be set to 0, the cluster ID may be changed from 0x456781 to 0x123401 and/or the tie break bit may be set to 0 (zero). The RA-PIBS message from UAVs 0x1234, 0x2345, and 0x3456 may remain unchanged, e.g., may include the same RA-PIBS messages from the second iteration 1704.

As shown from the RA-PIBS messages from the third iteration 1706, the CHBidBit for UAV 0x1234 may be 1 while the CHBidBit for UAVs 0x2345, 0x3456 and 0x4567 may be set to 0 (zero). In addition, the cluster ID for each of the UAVs may be 0x123401. As such, following the third iteration 1706, UAV 0x1234 may be deemed the cluster head of cluster ID 0x123401, which may include UAVs 0x2345, 0x3456 and 0x4567. After the RA formation phase ends, UAV 0x1234 may determine one or more resolutions to address the one or more conflicts associated with the cluster, e.g., conflicts between UAVs 0x1234, 0x2345, 0x3456 and/or 0x4567 in the cluster ID 0x123401.

After one or more iterations of RA-PIBS messages, a UAV may be deemed a cluster head. The UAV that wins the bid (e.g., UAV 0x1234) may set its cluster head bit to true and may apply the RA resolution time of the earliest member of the cluster (e.g., UAV 0x4567 in FIG. 16). The cluster head may update its RA-PIBS message by setting the RA phase field to resolution. The cluster head may implement a conflict resolution algorithm that offers conflict resolution to one or more UAVs in the cluster. The resolutions may be configured, performed and/or implemented by the cluster head, for example, in a pair-wise or a group-wise manner, which may be based on the algorithm implemented. The resolution determined for a UAV (e.g., UAV 0x2345) may be orthogonal and conflict free with respect to (e.g., every) other UAV in the cluster.

The cluster head may ensure that (e.g., all) resolutions are determined for a (e.g., each) UAV in the cluster. This may occur before the timer for RA resolution phase expires. The cluster head may run a time set to (RaResolutionTime) during which resolutions may be determined. RaResolutionTime may be configured by a UTM system for a UAV. If RaResolutionTime is not configured, it may be defaulted to a value, such as 1,000 milliseconds. The total time for a cluster to be resolved from a transmission of (e.g., first) RA-PIBS message may be set to GPS time+RaFormationTime+RaResolutionTime.

Resolutions may be transmitted to other UAVs by the cluster head using a RA-Resolutions parameter in a RA-PIBS message. A UAV within a cluster may receive the RA-PIBS message with an RA-resolution intended for it. The UAV may apply the resolution delivered by the cluster head. If the UAV is unable to accept or implement the RA-resolution determined and transmitted by the cluster head, the UAV may (re)commence the resolution advisory procedure (e.g., again) and/or may update the emergency flag in its PIBS message to true.

As noted above, a UAV (e.g., a new or additional UAV) may not be admitted to a cluster, for example, after the end of the RA formation phase. UAVs within a particular region, vicinity or neighborhood may be discovered by one another progressively (e.g., in an iterative and fully comprehensive expansion). A first UAV may learn about the full extent of other UAVs that may form a cluster in an iterative fashion. The first UAV may or may not receive PIBS messages directly from the other UAVs. After the end of the RA formation phase (e.g., at the beginning of the RA resolution phase), a new UAV may be discovered (e.g., the new UAV may enter the region or vicinity of a cluster that has already formed).

Figure 18:
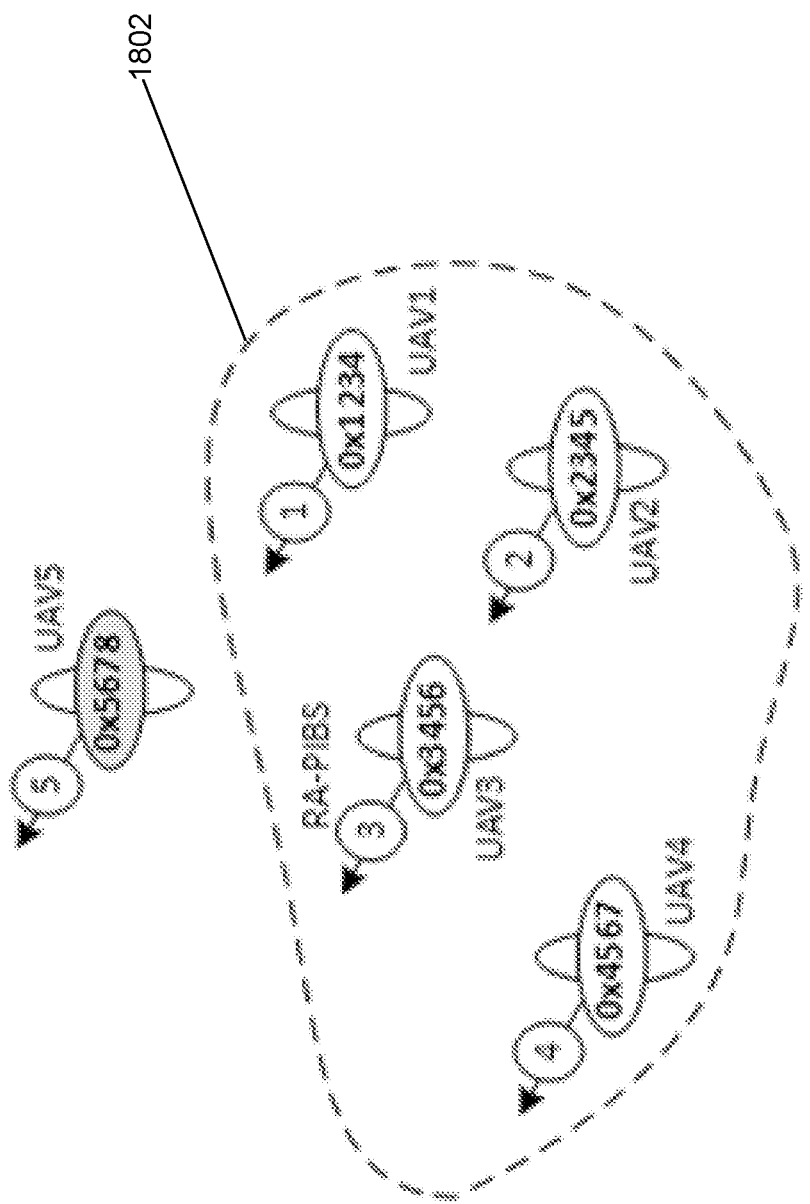
FIGS. 18 and 19 illustrate an example of UAV discovery for more than one cluster.
Figure 19:
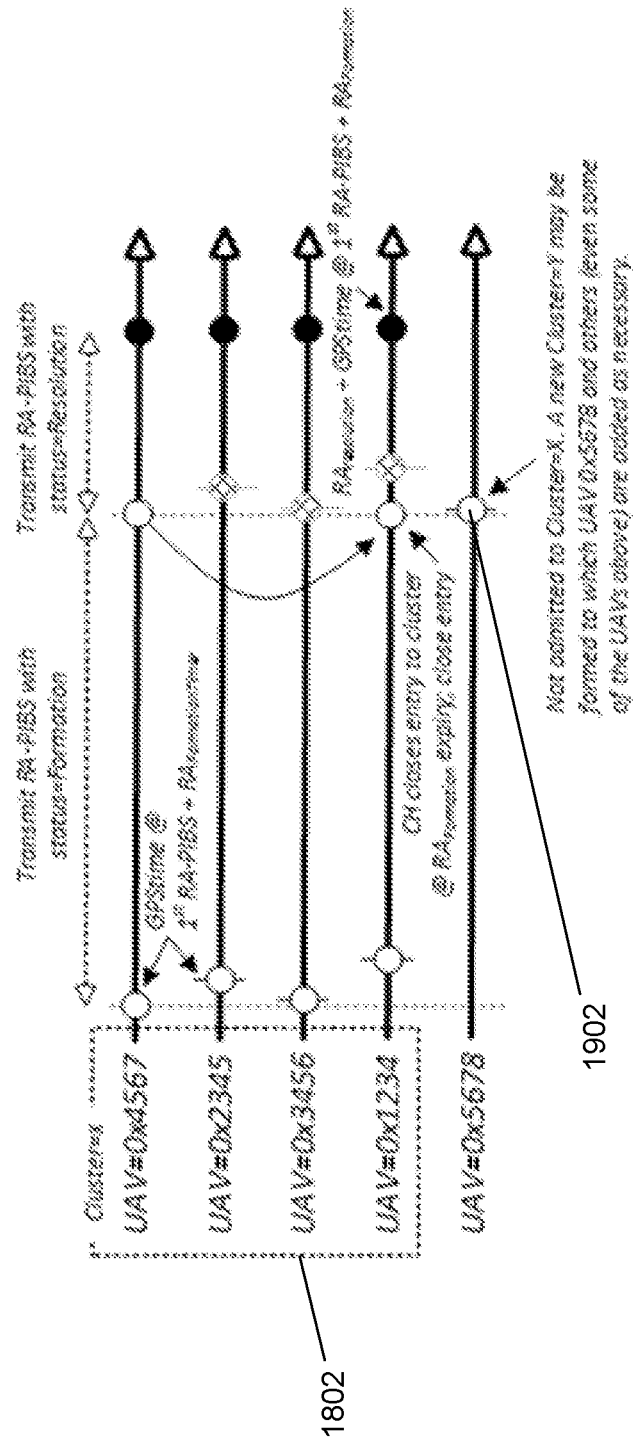

FIG. 18 depicts an example cluster 1802, which may include UAV1 (source ID 0x1234), UAV2 (source ID 0x2345), UAV3 (source ID 0x3456), and/or UAV4 (source ID 0x4567). A UAV5 (source ID 5678) may enter the vicinity or region of the cluster 1802 after the cluster 1802 has formed and/or during the RA resolution phase of the cluster 1802. For example, as shown in FIG. 19, UAV5 may transmit a RA-PIBS message at 1902, which may be after the RA formation phase of the cluster 1802 and/or during the RA resolution phase of the cluster 1802. As such, UAV5 may not be admitted to the cluster 1802 and may not be part of the resolutions identified by the cluster head. RA-PIBS messages from the UAVs within the cluster 1802 may (e.g., still) be broadcast during the RA resolution phase until the resolution(s) may be transmitted by the cluster head and/or implemented by the UAVs within the cluster 1802.

The RA-PIBS message from UAV5 at 1902 may indicate a conflict with UAV1, UAV2, UAV3 and/or UAV4 within the cluster 1802. UAV1, UAV2, UAV3 and/or UAV4 may be in a RA resolution phase associated with the cluster 1802 when they receive the RA-PIBS message from UAV5. UAV1, UAV2, UAV3 and/or UAV4 may not update their respective RA-PIBS messages associated with the cluster 1802, e.g., RA-PIBS messages including cluster ID 0x123401 described in connection with FIG. 17. The RA-PIBS message from UAV5 at 1902 may initiate a RA formation phase for another (e.g., new) cluster, which may include UAV1, UAV2, UAV3, UAV4 and/or UAV5. The RA formation and RA resolution periods of the other cluster may proceed in a manner as described in connection with FIGS. 16 and 17, for example, and may be in parallel and/or at least partially overlap with the RA formation and/or RA resolution phases of the cluster 1802. As such, a UAV may be associated with two or more (e.g., distinct) clusters at a given time and may transmit RA-PIBS messages for each cluster that it is associated with. The RA formation phase or RA resolution phase of one cluster may (e.g., at least partially) overlap with the RA formation phase or RA resolution phase of one or more of the other clusters. As noted above, the cluster initiated by UAV5 may include UAV1, UAV2, UAV3 and/or UAV4. As such, the cluster initiated by UAV5 may result in one or more resolutions that may influence or affect UAV1, UAV2, UAV3 and/or UAV4.

Figure 20:
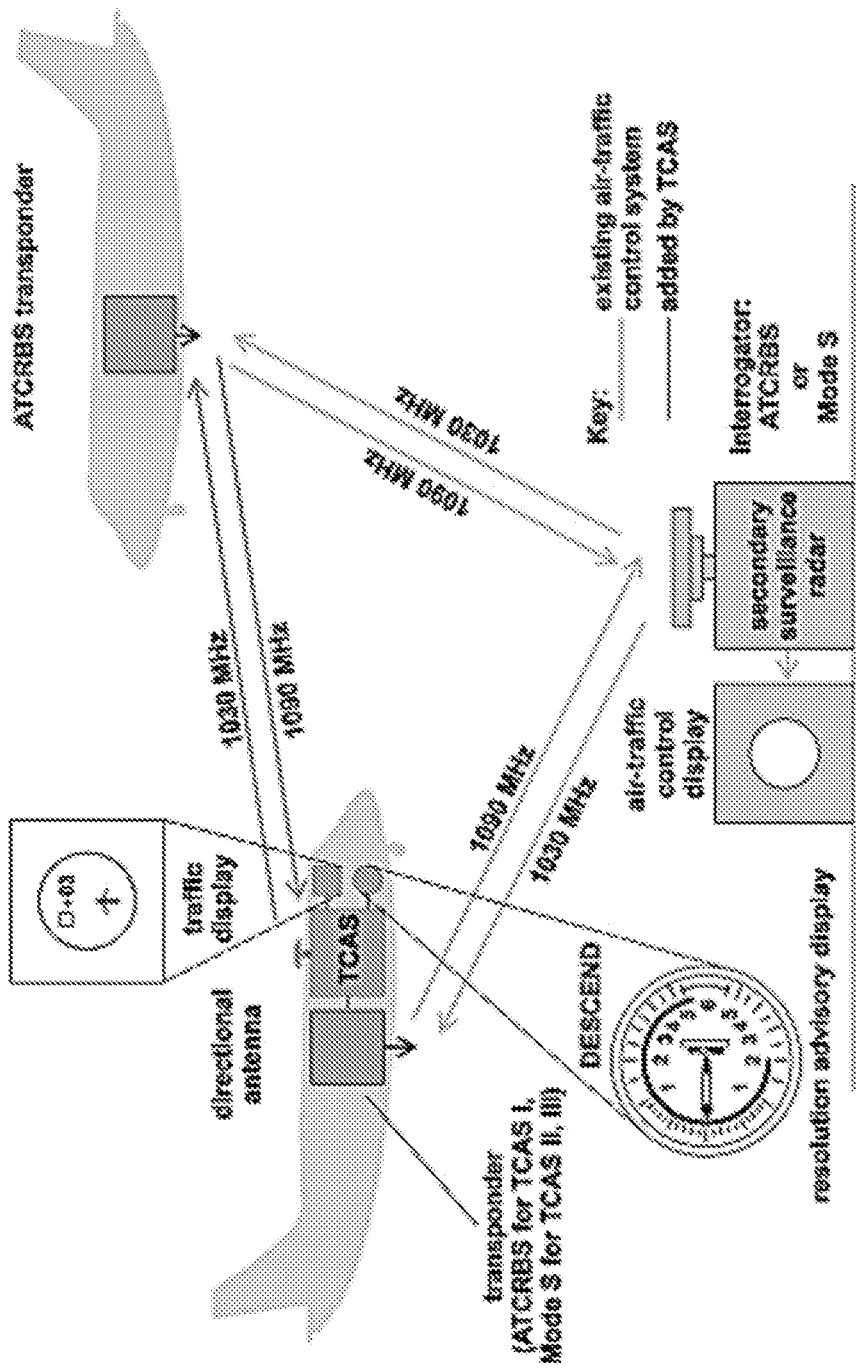
FIG. 20 illustrates an example traffic alert and Collision Avoidance System (TCAS).

FIG. 20 shows an example traffic alert and collision avoidance system (TCAS) for aircraft. TCAS may detect aircraft with transponders and may be an independent system designed to reduce mid-air incidences.

Distributed DAA function at edge nodes may be performed. The techniques described herein may be implemented in a dedicated function closer to an access network edge. The techniques may be distributed and there may not be specific coordination.

A distributed DAA system may receive one or more PIBS messages, PIBS-R messages, RA-PIBS messages, and/or conflict alert(s), as described herein, and may determine on an edge node which UAVs in the airspace may encounter a conflict. The edge node may form a cluster with a list of UAVs in potential conflict. At the expiration of a RA formation phase, the edge node may determine the resolutions applicable for a (e.g., each) UAV in the cluster. The resolutions may be included in one or more RA-PIBS messages, which may be sent directly to a UAV as an individually addressed message. A RA-PIBS message from an edge node implemented by a distributed DAA system or function may be transmitted by a eNB over a PDSCH addressed to a C-RNTI assigned to the WTRU module on the UAV. This may occur instead of a transmission on an SL resource. The RA-PIBS message may include data in a field, RA-resolutions, which may be applicable for the UAV, e.g., the UAV that is being directed to change course due to a conflict associated with the cluster.

If the distributed DAA system or function is implemented at an edge node, an eNB may unicast the RA-PIBS message(s) to the UAV directly via addressing its C-RNTI or the RA-PIBS message(s) may be broadcast to a group of UAVs via a group RNTI (G-RNTI). A group of UAVs receiving the RA-PIBS message(s) may monitor the PDSCH addressed via a G-RNTI. The RA-PIBS message(s) may include data pertaining to one or more UAVs and one or more resolutions may be found in the field RA-resolutions within the RA-PIBS message(s). An edge node may utilize the multicast functionality that may be enabled in a radio access network. The RA-PIBS may be multicast to the group of UAVs that have subscribed to the multicast.

What is claimed is:

1. A wireless transmit/receive unit (WTRU) for providing collision avoidance for vehicles, the WTRU comprising:
a memory; and
a processor configured to:
determine a first conflict between a first trajectory of a first unmanned vehicle and a second trajectory of a second unmanned vehicle;
send, to the second unmanned vehicle, a first message comprising:
a priority value associated with the first unmanned vehicle;
a request by the first unmanned vehicle to be a cluster head of a cluster comprising the first unmanned vehicle and the second unmanned vehicle; and
a first random value associated with the first message;
receive, from the second unmanned vehicle, a second message comprising:
a priority value associated with the second unmanned vehicle;
an indication of a second conflict between the second trajectory of the second unmanned vehicle and a third trajectory of a third vehicle;
a request by the second unmanned vehicle to be a cluster head of the cluster; and
a second random value associated with the second message;
select a cluster head for the cluster based on a comparison of the greater of the priority values associated with the first and second unmanned vehicles, wherein if the priority values are equal, the cluster head is selected based on a comparison of the first random value and the second random value; and
receive, from the selected cluster head, one or more resolution parameters to resolve the first conflict and the second conflict, whereupon at least one of the first trajectory, the second trajectory, or the third trajectory is changed.

2. The WTRU of claim 1, wherein the processor is further configured to receive a third message from the second unmanned vehicle or the third vehicle indicative of a third conflict between the third trajectory of the third vehicle and a fourth trajectory of a fourth vehicle.

3. The WTRU of claim 2, wherein the one or more resolution parameters provided by the processor further addresses the third conflict.

4. The WTRU of claim 1, wherein at least one of the first message or the second message comprises a position intent broadcast service (PIBS) message.

5. The WTRU of claim 1, wherein the processor is further configured to determine that the first unmanned vehicle is the cluster head based on the first priority value being higher than the second priority value.

6. The WTRU of claim 1, wherein the processor is further configured to send a third message that includes the one or more resolution parameters that addresses the first conflict and the second conflict.

7. The WTRU of claim 6, wherein the first message, the second message, and the third message each comprise a resolution advisory position intent broadcast service (RA-PIBS) message.

8. The WTRU of claim 6, wherein the first message is sent during a resolution advisory (RA) formation phase and the third message is sent during an RA resolution phase.

9. The WTRU of claim 1, wherein the WTRU is included in the first unmanned vehicle.

10. A method performed by a wireless transmit/receive unit (WTRU) for providing collision avoidance for a vehicle, the method comprising:
determining a first conflict between a first trajectory of a first unmanned vehicle and a second trajectory of a second unmanned vehicle;
sending, to the second unmanned vehicle, a first message comprising:
a priority value associated with the first unmanned vehicle;
a request by the first unmanned vehicle to be a cluster head of a cluster comprising the first unmanned vehicle and the second unmanned vehicle; and
a first random value associated with the first message;
receiving, from the second unmanned vehicle, a second message comprising:
a priority value associated with the second unmanned vehicle;
an indication of a second conflict between the second trajectory of the second unmanned vehicle and a third trajectory of a third vehicle;
a request by the second unmanned vehicle to be a cluster head of the cluster; and
a second random value associated with the second message;
selecting a cluster head for the cluster based on a comparison of the greater of the priority values associated with the first and second unmanned vehicles, wherein if the priority values are equal, the cluster head is selected based on a comparison of the first random value and the second random value; and
receiving, from the selected cluster head, one or more resolution parameters to resolve the first conflict and the second conflict, whereupon at least one of the first trajectory, the second trajectory, or the third trajectory is changed.

11. The method of claim 10, further comprising receiving a third message from the second unmanned vehicle or the third vehicle indicative of a third conflict between the third trajectory of the third vehicle and a fourth trajectory of a fourth vehicle.

12. The method of claim 11, wherein the one or more resolution parameters provided further addresses the third conflict.

13. The method of claim 10, wherein at least one of the first message or the second message comprises a position intent broadcast service (PIBS) message.

14. The method of claim 10, further comprising determining that the first unmanned vehicle is the cluster head based on the first priority value being higher than the second priority value.

15. The method of claim 10, further comprising sending a third message that includes the one or more resolution parameters that addresses the first conflict and the second conflict.

16. The method of claim 15, wherein the first message is sent during a resolution advisory (RA) formation phase and the third message is sent during an RA resolution phase.

17. The method of claim 10, further comprising sending the first message and the second message via a sidelink (SL) wireless resource.

18. The method of claim 10, wherein the WTRU is included in the first unmanned vehicle.

* * * * *